US008015547B2

(12) United States Patent
Harvey et al.

(10) Patent No.: US 8,015,547 B2
(45) Date of Patent: Sep. 6, 2011

(54) RECONFIGURABLE, HIERARCHICAL COMPONENT-BASED ARCHITECTURE AND FRAMEWORK AND METHODS FOR RAPIDLY DEVELOPING SENSOR DEVICE-ENABLING SOFTWARE APPLICATIONS

(75) Inventors: Clint M. Harvey, Morgantown, WV (US); Patrick R. Esposito, II, Morgantown, WV (US); John E. Moody, Morgantown, WV (US); Jackie P. Williams, II, Fairmont, WV (US); George K. Thomas, Morgantown, WV (US); Patrick R. Esposito, Morgantown, WV (US)

(73) Assignee: Augusta Systems, Inc., Morgantown, WV (US)

( * ) Notice: Subject to any disclaimer, the term of this patent is extended or adjusted under 35 U.S.C. 154(b) by 1451 days.

(21) Appl. No.: 11/478,085

(22) Filed: Jun. 29, 2006

(65) Prior Publication Data

US 2008/0005287 A1  Jan. 3, 2008

(51) Int. Cl.
 *G06F 9/45* (2006.01)
(52) U.S. Cl. ..................................................... 717/117
(58) Field of Classification Search .................. 717/117
See application file for complete search history.

(56) References Cited

U.S. PATENT DOCUMENTS

| | | | |
|---|---|---|---|
| 4,864,497 A | 9/1989 | Lowry | |
| 5,414,939 A * | 5/1995 | Waugaman | ..................... 33/522 |
| 6,633,878 B1 | 10/2003 | Underwood | |
| 6,636,242 B2 | 10/2003 | Bowman-Amuah | |
| 6,738,975 B1 | 5/2004 | Yee | |
| 6,836,890 B1 | 12/2004 | Waldorf | |
| 6,948,150 B1 | 9/2005 | Pepin | |
| 6,950,823 B2 | 9/2005 | Amiri | |
| 6,975,914 B2 | 12/2005 | DeRemer et al. | |
| 6,980,962 B1 | 12/2005 | Arganbright et al. | |
| 7,012,706 B1 | 3/2006 | Hansen | |
| 7,284,769 B2 * | 10/2007 | Breed | ........................... 280/735 |
| 7,479,875 B2 * | 1/2009 | Fehling et al. | ................. 340/506 |
| 7,774,242 B2 * | 8/2010 | Kubach et al. | .................. 705/28 |
| 2002/0053070 A1 | 5/2002 | Seki | |
| 2003/0005179 A1 | 1/2003 | Schmit et al. | |
| 2003/0005180 A1 | 1/2003 | Schmit et al. | |
| 2003/0009250 A1 | 1/2003 | Resnick et al. | |

(Continued)

OTHER PUBLICATIONS

6NET.ORG. "Deliverable 2.2.3." Editor Tim Chown, University of Southampton, May 2004.

(Continued)

*Primary Examiner* — John Chavis
(74) *Attorney, Agent, or Firm* — Coats & Bennett, P.L.L.C.

(57) ABSTRACT

A reconfigurable, hierarchical component-based architecture and framework for rapidly developing sensor device enabling software applications can have a rule-based data structuring system, a series table system, and a system of acquiring data from a data provider. User defined relationships can be established to enable exchange of data between the rule-based data structuring system, the series table system, the system of acquiring data, another rule-based data structuring system, an object oriented wrapping system, a data filtering system, a data structure grouping and merging system, a data device writer system, and a network communications system. Each system can have components and subcomponents by which the user defined relationships can be established, for example by embedding components of various systems within the rule-based data structuring system, and/or other systems, and/or by setting a property value to link components of the systems with a component of the rule-based data structuring system and/or other systems.

28 Claims, 9 Drawing Sheets

U.S. PATENT DOCUMENTS

| | | | |
|---|---|---|---|
| 2003/0028579 A1 | 2/2003 | Kulkarni et al. | |
| 2003/0084091 A1 | 5/2003 | Agarwalla | |
| 2004/0001498 A1 | 1/2004 | Chen | |
| 2004/0036719 A1 | 2/2004 | Van Treeck | |
| 2004/0045009 A1 | 3/2004 | Bryant | |
| 2004/0078137 A1 | 4/2004 | Breakfield et al. | |
| 2004/0103073 A1 | 5/2004 | Blake et al. | |
| 2004/0117393 A1 | 6/2004 | DeMesa | |
| 2004/0117798 A1 | 6/2004 | Newman | |
| 2004/0128370 A1 | 7/2004 | Kortright | |
| 2004/0158819 A1* | 8/2004 | Cuomo et al. | 717/128 |
| 2004/0187140 A1 | 9/2004 | Aigner | |
| 2004/0268301 A1 | 12/2004 | Kaston | |
| 2004/0268312 A1 | 12/2004 | Abe et al. | |
| 2005/0005262 A1 | 1/2005 | Mohan et al. | |
| 2005/0015775 A1 | 1/2005 | Russell | |
| 2005/0021713 A1 | 1/2005 | Dugan et al. | |
| 2005/0049988 A1* | 3/2005 | Dahlquist et al. | 706/46 |
| 2005/0055449 A1 | 3/2005 | Rappold | |
| 2005/0071850 A1 | 3/2005 | Ittel et al. | |
| 2005/0080814 A1 | 4/2005 | Hailey | |
| 2005/0102652 A1 | 5/2005 | Sulm et al. | |
| 2005/0132294 A1 | 6/2005 | Dinger | |
| 2005/0149558 A1 | 7/2005 | Zhuk | |
| 2005/0160400 A1 | 7/2005 | Pepin | |
| 2005/0171746 A1 | 8/2005 | Thalhammer-Reyero | |
| 2005/0177269 A1* | 8/2005 | Funk | 700/121 |
| 2005/0177818 A1 | 8/2005 | Huene et al. | |
| 2005/0246716 A1 | 11/2005 | Smith et al. | |
| 2005/0285740 A1* | 12/2005 | Kubach et al. | 340/572.1 |
| 2005/0289124 A1 | 12/2005 | Kaiser et al. | |
| 2006/0002387 A1 | 1/2006 | Lawrence et al. | |
| 2006/0009944 A1 | 1/2006 | Shah et al. | |
| 2006/0013458 A1 | 1/2006 | Debbins et al. | |
| 2006/0036745 A1 | 2/2006 | Stienhans et al. | |
| 2006/0047545 A1 | 3/2006 | Kumar et al. | |
| 2006/0058987 A1 | 3/2006 | Kumar | |
| 2006/0059127 A1 | 3/2006 | Berry et al. | |
| 2006/0064422 A1 | 3/2006 | Arthurs et al. | |
| 2006/0064677 A1 | 3/2006 | Bickson et al. | |
| 2006/0067209 A1 | 3/2006 | Sheehan | |
| 2006/0074736 A1 | 4/2006 | Shukla et al. | |
| 2006/0075112 A1 | 4/2006 | Polozoff | |
| 2006/0075408 A1 | 4/2006 | Powers et al. | |
| 2006/0092142 A1 | 5/2006 | Gillespie et al. | |
| 2006/0095195 A1* | 5/2006 | Nishimura et al. | 701/96 |
| 2006/0106585 A1 | 5/2006 | Brown et al. | |
| 2006/0111880 A1 | 5/2006 | Brown et al. | |
| 2006/0117251 A1 | 6/2006 | Rothschiller | |
| 2006/0123010 A1 | 6/2006 | Landry | |
| 2006/0142978 A1* | 6/2006 | Suenbuel et al. | 703/1 |
| 2006/0161909 A1 | 7/2006 | Pandey et al. | |
| 2006/0165040 A1 | 7/2006 | Rathod | |
| 2006/0206850 A1* | 9/2006 | McCubbrey | 716/17 |

OTHER PUBLICATIONS

" .NET Remoting." Definition from Wikipedia.com. Available at: http://en.wikipedia.org/wiki/.NET_Remoting.

"Recursion Software Extends .NET Compatibility to the JBoss Platform for Distributed and Mobile Networks." Recursion Software, Inc. Press Release. Available at: http://recursionsw.com/About_Us/inc/2007-6-19-VoyagerEdge_6-1_JBoss.pdf.

"D 1.8 Ambient Networking: Concepts and Architecture." Sixth Framework Programme, Priority IST-2002-2.3-1-4, Mobile and Wireless Systems beyond 3G, Project 507134, WWI Ambient Networks.

Gu, X. et al. "Adaptive Offloading for Pervasive Computing." IEEE Pervasive Computing, vol. 3, Issue 3, Jul.-Sep. 2004, pp. 66-73.

".NET Framework Remoting Overview." Microsoft Corporation 2007. Available at: http://msdn2.microsoft.com/en-us/library/kwdt6w2k.aspx.

Yocam, E. W. "Evolution on the Network Edge: Intelligent Devices." IT Professional, vol. 5, Issue 2, Mar./Apr. 2003, pp. 32-36.

Lekas, S. "Software Add-Ons; A Low-Cost, Powerful Solution for PC-Based Data Acquisition." Adapted from an article that appeared in ECN, Apr. 1996. Available at: http://www.iotech.com/ecnapr96.html.

Gu, X. et al. "An XML-based Quality of Service Enabling Language for the Web." Journal of Visual Languages & Computing, vol. 13, No. 1, Feb. 2002, pp. 61-95.

"PC-BOT 914 Components for Visual Studio 2005." White Box Robotics, May 12, 2007. Available at: http://whiteboxrobotics.com/PCBOTs/pdf/PC-BOT_dotNet_v1.0_documentation.pdf.

"0.0 Setting up the Visual Studio Environment with Phidgets.NET." Pervasive Computing, Lab Notes, Sep. 7, 2005. Available at: http://www.informatics.indiana.edu/yrogers/pervasive/downloads/InterfaceSkinTest.pdf.

Wong, W. "SDK Targets Emerging Robotics Market." Electronic Design (ED Online ID#13272), Sep. 1, 2006. Available at: http://electronicdesign.com/Articles/Index.cfm?AD=1&ArticleID=13272.

Patrizio, A. "Recursion Keeps Device Developers on the Edge." Recursion Software, Inc. Available at: http://www.recursionsw.com/About_Us/inc/SDTimes_Voyager.pdf.

"Data Acquisition and Control Programming Tools—User's Guide." Universal Library. Measurement Computing. Available at www.mccdaq.com.

Golatowski et al., "Service-Oriented Software Architecture for Sensor Networks," International Workshop on Mobile Computing, Jun. 1, 2003, pp. 1-8, Rostock, Germany.

Levis et al., "TinyOS: An Operating System for Sensor Networks," Ambient Intelligence, Jan. 1, 2005, pp. 115-148, Springer Berlin Heidelberg, Germany.

Marin et al., "Sensor Bean: A Component Platform for Sensor-Based Services," Proceedings for the 3rd International Workshop on Middleware for Pervasive and Ad-Hoc Computing, Nov. 28, 2005, pp. 1-8, vol. 115, Grenoble, France.

Morton et al., "An Approach to Develop Component-Based Control Software for Flexible Manufacturing Systems," Proceedings of the American Control Conference, pp. 4708-4713, May 8-10, 2002, IEEE, New York, NY.

Dao, Thuy Chan (US Patent Examiner). Final Office Action mailed Feb. 10, 2011 in co-pending U.S. Appl. No. 11/859,264.

* cited by examiner

RECONFIGURABLE, HIERARCHICAL COMPONENT-BASED ARCHITECTURE AND FRAMEWORK AND METHODS FOR RAPIDLY DEVELOPING SENSOR DEVICE-ENABLING SOFTWARE APPLICATIONS

BACKGROUND

The present invention relates to systems, methods, and computer programs for a reconfigurable, hierarchical component-based architecture and framework for rapid development of sensor device-enabling software applications.

Sensors are vital components in a vast array of security, automotive, industrial, medical, commercial, as well as consumer products. Sensors are integral to the functionality, performance, and distinctiveness of an expanding array of established and emerging industries and applications, including automotive, process control, consumer electronics and office and industrial automation products, machinery monitoring, air and ground transportation, environmental monitoring, HVAC/building automation, home appliances, medical devices and equipment, aerospace, security, and wireless monitoring systems. Sensors are a key enabling technology that continues to find opportunities to allow for achieving new and promising, potentially high-volume applications; for example, automotive stability control, rollover detection, cabin air quality monitoring, occupancy detection, tire pressure monitoring; handheld devices (including mobile phones, personal digital assistants, tablet computers, global positioning system-equipped devices); and expanded sensor networks in industrial, commercial or homeland security applications.

The future of the sensors lies with wireless sensor networks and complex, multi-sensor systems. Wireless sensors (i.e., sensors that transmit and/or receive data without using a physical wire connection) have highly realistic growth opportunities in diverse applications that require sensor networks that are cost-effective and easy to install, deploy, and reconfigure. Moreover, the continually evolving wireless communications protocols standards continue to help drive the expansion of more economical sensor networks. It is expected that networked wireless sensors will increasingly gain a real foothold in the marketplace and generate significant revenue, as standard wireless communication protocols and data structures that support a wide range of applications become geared toward optimizing sensor networks.

Companies that design and integrate systems that incorporate sensors tend to provide custom-design methodologies and solutions for specific sensor applications. Such customized processing solutions can result in high cost and are often not readily transferable to other applications. The present invention remedies this problem by optimizing sensor design, processing, and implementation and provides a design-time and run-time tool set that can enable developers of all experience to readily create sensor-based applications.

It is widely accepted that the future of sensor network and system application development lies within spearheading the design, development, and commercialization of an economical, modular, powerful, plug-and-play sensor processing system.

Thus, in the fragmented and application-specific sensor marketplace, there is a need for a smart sensing and flexible solution, such as a Reconfigurable, Hierarchical Component-Based Architecture & Framework and Methods for Rapidly Developing Sensor Device-Enabling Software Applications, to enable a wide variety of sensors to have plug-and-play capability across a wide range of applications which will provide significant value to sensor element manufacturers and designers as well as developers and users of sensor-based systems. Such capabilities can greatly expand the served applications for sensors and sensor-based products.

SUMMARY

A Reconfigurable, Hierarchical Component-Based Architecture & Framework and Methods for Rapidly Developing Sensor Device-Enabling Software Applications as described herein generally comprises a sensor-based application toolset, which features design-time and run-time components, that allows software developers and engineers to rapidly develop and deploy diverse sensor-based software applications and systems. The systems and methods described herein can be utilized on an end-user computer for or with enterprise, visualization, and other display technologies, as well as on servers, at-point with sensors or sensor networks, or with other distributed computing processors. Although the method and systems described herein are particularly applicable to sensor-based data, other types of device data could be utilized.

The methods and systems described are both sensor and database agnostic, which means data can be incorporated from a litany of sensor types and information supplied to a variety of database and file structures. Different sensor types include, for example, electro-optic sensors (still, video, panoramic), individual environmental and condition monitoring sensors, wireless sensors, wireless sensor networks, and radio-frequency identification (RFID) tags. The databases that can be powered by the systems and methods described herein include, for example, Microsoft SQL Server, Oracle, MySQL, Microsoft Access, Excel and others. This allows for a variety of sensors, sensor aggregator technologies, databases, and visualization applications to be utilized with the systems and methods described herein.

The Reconfigurable, Hierarchical Component-Based Architecture & Framework and Methods for Rapidly Developing Sensor Device-Enabling Software Applications can reduce the costs associated with development of sensor, or other device, based applications, integrate multiple types of sensors into a sensor-based application, providing quality assurance for any software application, reconfigure a new application any time a new sensor is added to the system, and update or change the application. Moreover, the associated systems and methods described herein allow for optimal utilization of all sensors in a sensor based system/application. These systems and methods also allow developers and engineers to use the programming language and programming environment of their choice, thereby reducing the learning curve associated with learning new software.

An embodiment of a Reconfigurable, Hierarchical Component-Based Architecture & Framework and Methods for Rapidly Developing Sensor Device-Enabling Software Applications can generally comprise a rule-based data structuring system having a series component and an associated field subcomponent; a series table system having a series table component; and a system of acquiring data from a data provider, wherein the data preferably includes some portion of sensor data The rule-based data structuring system can be configured by user-defined relationships to exchange data with at least one of another rule-based data structuring system, the system of acquiring data, the series table system, an object oriented wrapping system having at least one of a command component and an associated parameter subcomponent, and a data filtering system having at least one of a filter component and an associated condition subcomponent Furthermore, the user-defined relationships can established by embedding components of such listed systems within the rule-based data structuring system and/or by setting a single property value to link components of the various listed systems with the series component of the rule-based data structuring system. The user defined relationships can be established using provided design-time (visual) or programmatic interfaces.

The field, parameter and condition subcomponents can also be user-defined, and the relationship can be similarly established, such as by embedding the subcomponent in the rule based data structuring system or linking it thereto, such as via an associated component of the subcomponent, which associated component must be embedded in, or linked to a component of, the rule based data structuring system.

The rule-based data structuring system can also be configured according to the user-defined relationships to exchange data with one or more of: a data structure grouping and merging system having a sensor group component, an associated group series subcomponent, an associated existing field subcomponent, and an associated trigger subcomponent; a data device writer system having an associated device writer component; and a network communications system having a data sending component and/or a data receiving component.

The group series, existing field and/or trigger subcomponents can each be user-defined, and can likewise be embedded, or linked to, an associated component to establish the user defined relationships. The user defined relationships can also be established among other systems, including the system of acquiring data, the series table system, the object oriented wrapping system, the data filtering system, the data structure grouping and merging system, the data device writer system, and the network communications, such that data can be exchanged among the various systems as well as with the rule-based data structuring system.

An embodiment of the reconfigurable hierarchical component based architecture and framework as described above can further comprise one or more central device component, each of which can be comprised of one or more of the rule-based data structuring system, the system of acquiring data, the series table system, the object oriented wrapping system, the data filtering system, the data structure grouping and merging system, the data device writer system, and the network communications system. The central device component thus comprises a logical sensor, i.e., a logical representation of a sensor, or like device, which can also generally be referred to as a data provider. Multiple instances of the central device component, which can represent multiple data providers, can be created and each can be usable at the same time.

An embodiment of a method for rapidly developing sensor device-enabling software applications can generally comprise defining a rule-based data structuring system having a series component and a field subcomponent; defining a series table system having a series table component; receiving sensor data into the rule-based data structuring system; defining relationships to exchange data between the rule-based data structuring system and one or more of another rule-based data structuring system; the system of acquiring data; the series table system; an object oriented wrapping system having a command component and a parameter subcomponent; and a data filtering system having a filter component and a condition subcomponent.

The method of establishing user defined relationships can comprise embedding components of such listed systems within the rule-based data structuring system and/or setting a single property value to link components of such listed systems with the series component of the rule-based data structuring system.

The field, parameter and condition subcomponents can also be user-defined, and the relationship can be similarly established, such as by embedding the subcomponent in the rule based data structuring system or linking it thereto, such as via an associated component of the subcomponent, which associated component must be embedded in, or linked to a component of, the rule based data structuring system.

The method can further comprise defining relationships to exchange data between the rule-based data structuring system and one or more of: a data structure grouping and merging system having a sensor group component, a group series subcomponent, an existing field subcomponent, and/or a trigger subcomponent; a data device writer system having a device writer component; and a network communications system having a data sending component and/or a data receiving component. The relationships can be user defined, and can be established as described above, e.g., by embedding components of the systems within the rule-based data structuring system and/or setting a single property value to link components of the systems with the series component of the rule-based data structuring system.

The field, parameter and condition subcomponents can also be user-defined, and the relationship can be established as described previously, such as by being embedded, or linked in combination with a respective associated component, in which the respective component (associated with the subcomponent) must itself be embedded, or linked to a component of the rule based data structuring system.

Embodiments of the method can further comprise defining relationships to exchange data among other systems, such as: the system of acquiring data, the series table system, the object oriented wrapping system, the data filtering system, the data structure grouping and merging system, the data device writer system, and the network communications system. Methods for establishing user defined relationships therebetween can be as described above, e.g., by embedding components of such listed systems within the rule-based data structuring system and/or by setting a single property value to link components of such listed systems with the series component of the rule-based data structuring system.

Further embodiments of the method can comprise representing one or more of the rule-based data structuring system, the system of acquiring data, the series table system, the object oriented wrapping system, the data filtering system, the data structure grouping and merging system, the data device writer system, and the network communications system as a central device component Multiple instances of central device components can be created wherein each is a logical representation of a device, such as a sensor or like device, which provides data to be processed by the method. A plurality of instances of the central device components can each be used at the same time.

In general, functions which can be performed according to certain embodiments of systems and methods associated with a Reconfigurable, Hierarchical Component-Based Architecture & Framework and Methods for Rapidly Developing Sensor Device-Enabling Software Applications as described herein can further comprise, for example, one or more of the following:

Automatically wrapping third party SDKs and APIs from both managed and unmanaged dynamic link libraries (DLLs);

Eliminating the need for aliasing like function names by storing the dynamic link library (DLLs) wrapping calls in separate assemblies within memory;

Performing behind-the-scenes data type conversions;

Performing rule-based data structuring;

Automatically building custom data structures based off of existing data structures;

Performing rule-based data filtering;

Providing for data logging and database insertion in various formats;

Automatically creating database(s), tables, fields, and rows in various database and file formats;

Performing event-driven data merging of different specified data structures;

Logically grouping various data structures, so that they can be treated as one logical data structure;

Performing the merging of different data structures by using common primary keys;

Building custom data structures using the designer interface, including the ability to append custom data fields;

Allowing direct data binding to common integrated development environment (IDE) controls;

Empowering event catching that allows for the retrieval or modification of values, before or after the fact;

Automatically populating data structures based on events (such as another data structure being populated or a command being executed);

Calling wrapped function calls for a group of data structures with a single command;

Performing low-level data fusion;

Being particularly useful for applications that use complex data sets (systems that have heterogeneous sensors);

Enabling cloning and serialization of existing sensor components (including their corresponding data structure schema);

Establishing a relationship link between a different data structure and another data structure, or between a data structure and a return value and/or parameter value of a wrapped function;

Transferring data between different data structures using network communication protocols including TCP/IP and UDP supporting IPv4, IPv6, and other standards;

Providing visual, object-oriented, drag-and-drop design-time components that allow for the custom definition of incoming data;

Providing run-time components that allow for the definition of incoming data;

Providing a single-click/single entry design-time component interface to define the various data structures (sensors) and its corresponding subcomponents;

Automatically generating code in common object oriented programming languages based upon the defined design-time components and subcomponents;

Providing the framework and functionality for utilization of sensor and non-sensor data including security convergence;

Reducing the time to market of a software application;

Integrating seamlessly into Integrated Development Environments (IDEs);

Providing complete help system and API documentation that seamlessly integrates with the existing help systems of IDEs; and, Providing developers a means to rapidly develop sensor network applications by automatically/dynamically generating the object oriented code that is defined in the provided components.

To the accomplishment of the foregoing and related ends, certain illustrative aspects of the present invention are described herein in connection with the following description and the associated drawing figures. These aspects are indicative of but some of the various ways in which the principles of the present invention may be employed, and the present invention is intended to include all such aspects and their equivalents. Other advantages and novel features of the present invention may become apparent from the following detailed description of the present invention when considered in conjunction with the drawings.

BRIEF DESCRIPTION OF THE DRAWING FIGURES

The features and advantages of the present invention will become more apparent from the detailed description, set forth below, when taken in conjunction with the drawings in which.

DETAILED DESCRIPTION OF CERTAIN EMBODIMENTS

Figure 1:
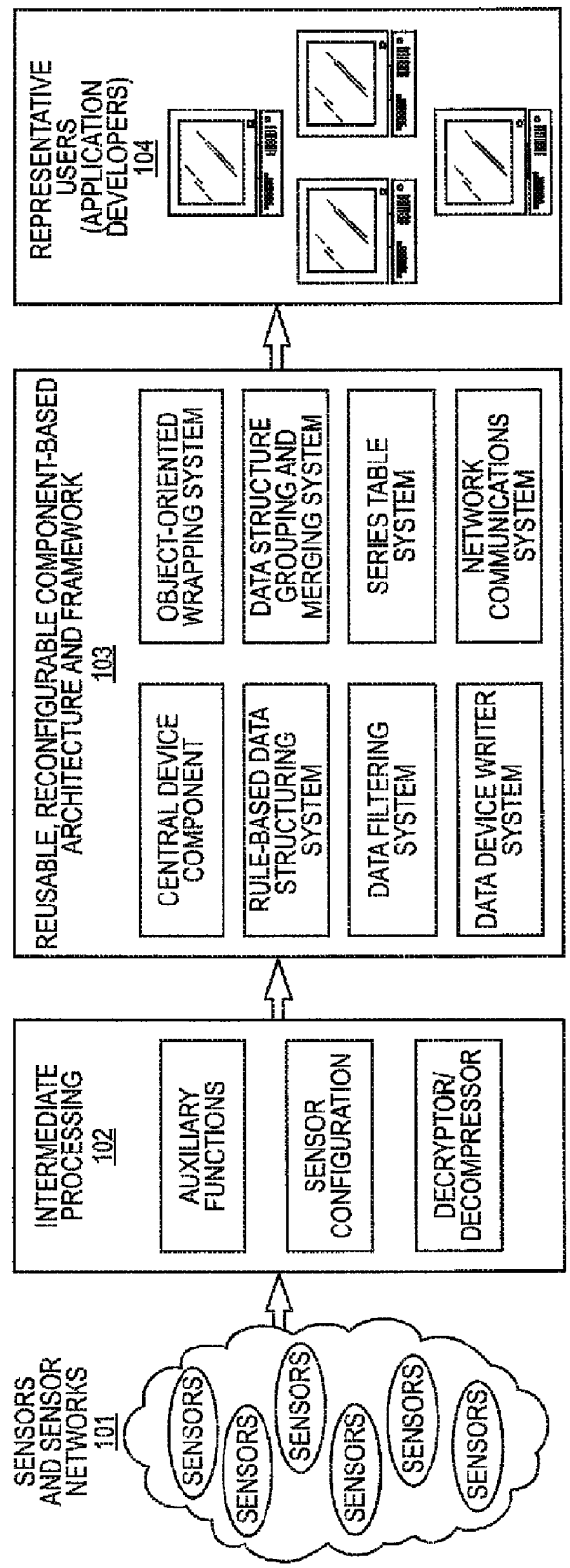
FIG. 1 is a block diagram illustrating a system architecture of an embodiment of a reconfigurable, hierarchical component-based architecture and framework for rapid development of sensor device-enabling software applications, showing the data flow of sensor device data from a sensor device to the end user software application.

The present invention is now described with reference to the drawings, wherein like reference numerals are used to refer to like elements throughout. Additionally, the left-most digit of a reference number identifies the drawing in which the reference number first appears.

In the following description, for purposes of explanation, numerous specific details are set forth in order to provide a thorough understanding of the Reconfigurable, Hierarchical Component-Based Architecture & Framework and Methods for Rapidly Developing Sensor Device-Enabling Software Applications. For convenience, the Reconfigurable, Hierarchical Component-Based Architecture & Framework and Methods for Rapidly Developing Sensor Device-Enabling Software Applications will be referred to hereinafter simply as "the present invention," but it is to be understood that all such references hereinafter to "the present invention" are intended to embrace any alterations, modifications and variations of the present invention that fall within the spirit and scope of the associated claims.

It may become apparent to one skilled in the art that the present invention may be practiced without these specific details. In other instances, well-known structures and devices may be shown in block diagram form in order to facilitate description of the present invention.

Overview

The present invention is a sensor-based application toolset, which features design-time and run-time components, that allows software developers and engineers to rapidly develop and deploy diverse sensor-based software applications and systems. The present invention can be utilized on an end-user computer for or with enterprise, visualization, and other display technologies, as well as on servers, at-point with sensors or sensor networks, or with other distributed computing processors.

The present invention is both sensor and database agnostic, which means that it can incorporate data from a litany of sensor types and supply information to a variety of database and file structures. Among the sensor types are electro-optic sensors (still, video, panoramic), individual environmental and condition monitoring sensors, wireless sensors, wireless sensor networks, and radio-frequency identification (RFID) tags. Among the databases that can be powered by the systems and methods described herein are Microsoft SQL Server, Oracle, MySQL, Microsoft Access, Excel and others. This allows for a variety of sensors, sensor aggregator technologies, databases, and visualization applications to be utilized along with the present invention.

The present invention reduces the costs associated with development of sensor-based applications, integrating multiple types of sensors into a sensor-based application, providing quality assurance for any software application, reconfiguring a new application any time a new sensor is added to the system, and updating or changing the application. Moreover, the present invention allows for optimal utilization of all sensors in the sensor based system/application. Further, the present invention allows developers and engineers to use the programming language and programming environment of their choice, thereby reducing the learning curve associated with learning new software.

In general, functions which can be performed according to certain embodiments of systems and methods associated with a Reconfigurable, Hierarchical Component-Based Architecture & Framework and Methods for Rapidly Developing Sensor Device-Enabling Software Applications as described herein can further comprise, for example, one or more of the following:

Automatically wrapping third party SDKs and APIs from both managed and unmanaged dynamic link libraries (DLLs);

Eliminating the need for aliasing like function names by storing the dynamic link library (DLLs) wrapping calls in separate assemblies within memory;

Performing behind-the-scenes data type conversions;

Performing rule-based data structuring;

Automatically building custom data structures based off of existing data structures;

Performing rule-based data filtering;

Providing for data logging and database insertion in various formats;

Automatically creating database(s), tables, fields, and rows in various database and file formats;

Performing event-driven data merging of different specified data structures;

Logically grouping various data structures, so that they can be treated as one logical data structure;

Performing the merging of different data structures by using common primary keys;

Building custom data structures using the designer interface, including the ability to append custom data fields;

Allowing direct data binding to common integrated development environment (IDE) controls;

Empowering event catching that allows for the retrieval or modification of values, before or after the fact;

Automatically populating data structures based on events (such as another data structure being populated or a command being executed);

Calling wrapped function calls for a group of data structures with a single command;

Performing low-level data fusion;

Being particularly useful for applications that use complex data sets (systems that have heterogeneous sensors);

Enabling cloning and serialization of existing. sensor components (including their corresponding data structure schema);

Establishing a relationship link between a different data structure and another data structure, or between a data structure and a return value and/or parameter value of a wrapped function;

Transferring data between different data structures using network communication protocols including TCP/IP and UDP supporting IPv4, IPv6, and other standards;

Providing visual, object-oriented, drag-and-drop design-time components that allow for the custom definition of incoming data;

Providing run-time components that allow for the definition of incoming data;

Providing a single-click/single entry design-time component interface to define the various data structures (sensors) and its corresponding subcomponents;

Automatically generating code in common object oriented programming languages based upon the defined design-time components and subcomponents;

Providing the framework and functionality for utilization of sensor and non-sensor data including security convergence;

Reducing the time to market of a software application;

Integrating seamlessly into Integrated Development Environments (IDEs);

Providing complete help system and API documentation that seamlessly integrates with the existing help systems of IDEs; and, Providing developers a means to rapidly develop sensor network applications by automatically/dynamically generating the object oriented code that is defined in the provided components.

System Architecture Overview

Referring to FIG. 1, a block diagram illustrating the data flow of sensor device data among various processing stages from the actual sensor device to the end-user software application interface is shown. It should be understood that the particular architecture and framework 103, shown in FIG. 1 is for illustrative purposes only and does not limit the present invention. Other implementations for performing the functions described herein will be apparent to persons skilled in the relevant art(s) based on the teaching contained herein, and the present invention is directed to such other implementations.

FIG. 1 illustrates means by which raw sensor device data is processed into useful decision making information, in the context in which an exemplary embodiment is applied. The Sensor and Sensor Networks region 101 of the diagram illustrate the capturing and transmission of raw sensor data, or data which includes sensor data. Although the present invention is particularly applicable to processing sensor data, it is to be understood that other types of data could also be processed.

The Intermediate Processing region 102 illustrates the low-level functions, i.e., via third party software development kits (SDKs) and application program interfaces (APIs), that take place in order to transmit the raw sensor data into decrypted, configured data that can be received into an Integrated Development Environment (IDE). The Reusable, Reconfigurable Component-Based Architecture and Framework region 103 illustrates an embodiment of an architecture and framework 103 residing within an IDE that enables communication, management, structuring, filtering, fusion, and exportation of raw sensor data. The architecture and framework 103 enables developers to rapidly develop sensor-enabling applications by providing a modular, flexible architecture where various system, components, and methods interact to produce customized, reconfigurable applications. The End-User Software Application Interface region 104 illustrates an application of the sensor data acquired through the architecture and framework 103 to produce an end-user graphical interface to interpret the raw sensor data into useful decision making information.

General System Operation

Figure 2:
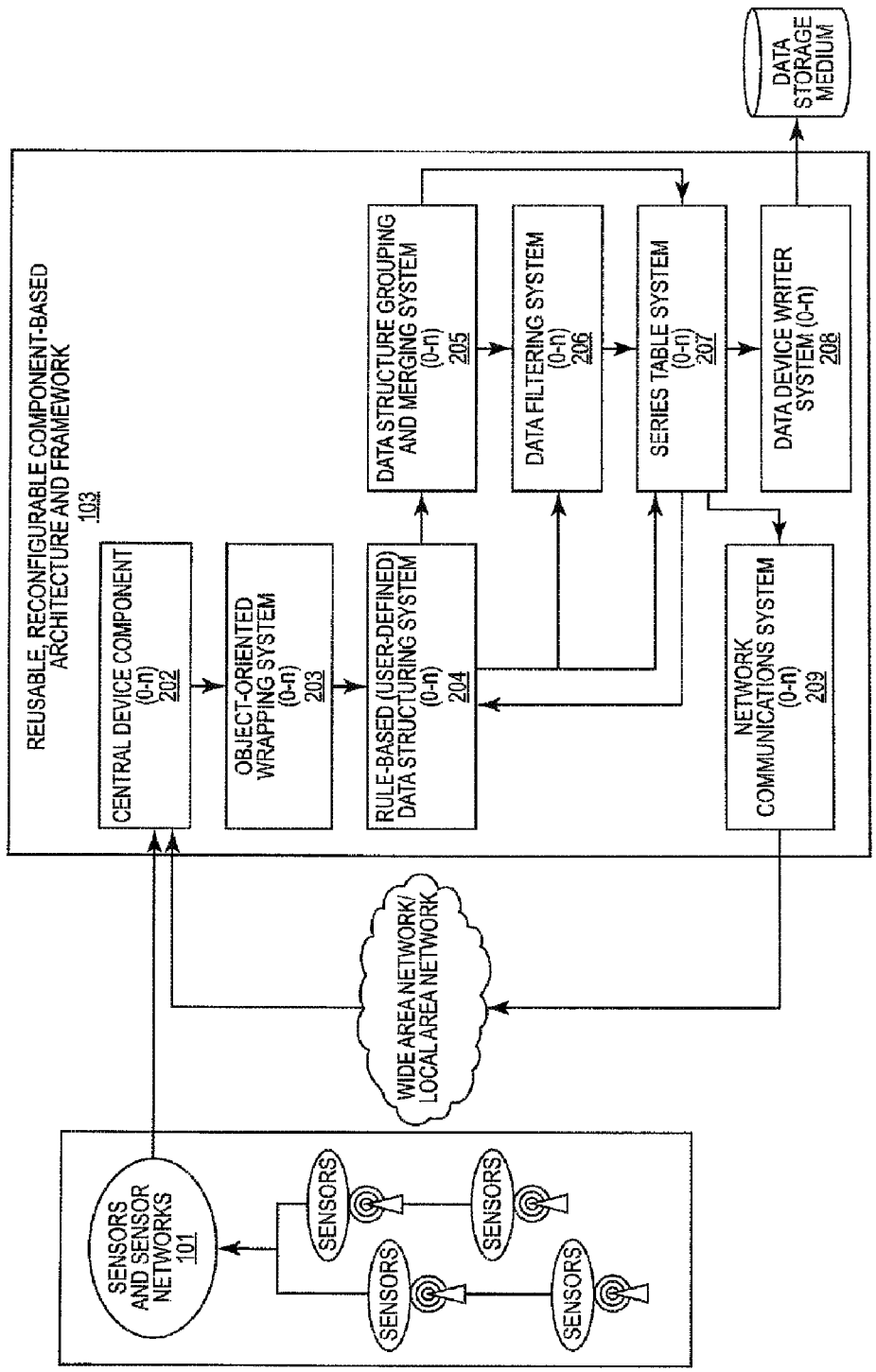
FIG. 2 is a block diagram illustrating the software architecture of an embodiment of a reconfigurable, hierarchical component-based architecture and framework for rapid development of sensor device-enabling software applications, showing communication among the various components of an embodiment of the system of FIG. 1.

Referring to FIG. 2, this block diagram illustrates an embodiment of a central device component 202 and the various systems, and the interaction between the various systems within an embodiment of the reusable, reconfigurable component-based architecture and framework region 103 of FIG. 1. These systems include but are not limited to, a central device component 202, an object-oriented wrapping system 203, a rule-based data structuring system 204, a data structure grouping and merging system 205, a data filtering system 206, a series table system 207, a data device writer system 208, as well as a network communications system 209.

Collectively, the component-based architecture and framework systems, permit a developer or engineer to wrap third party software development kits (SDKs) and application program interfaces (APIs), create custom data structures for the sensor device data, and perform various actions on the custom data structures, such as filtering structures, grouping structures, merging structures, data sourcing and data binding to structures, automatic database and file creation and insertion of structures, as well as exportation of data structures. More details on the structure of the delineated data processing systems are provided hereinafter in connection with the description of FIG. 3 (Object-Oriented Wrapping System), FIG. 4 (Rule-Based Data Structuring System), FIG. 5 (Data Structure Grouping and Merging System), FIG. 6 (Data filtering system), FIG. 7 (Series Table System), FIG. 8 (Data Device Writer System), and FIG. 9 (Network Communications System).

The hierarchical, reconfigurable component-based architecture and framework 103 provides a developer or engineer with an architecture and framework written in a common object-oriented programming language that enables the rapid development of a software application layer by using a suite of components that defined interactions between system components and subcomponents. The architecture and framework provides an object-oriented design component toolset for providing object template derivation tools for accessing and editing a set of object-based templates. This permits developers of applications to reuse and reconfigure components in a modular fashion.

The architecture and framework 103 implements a reusable software component encapsulating functionality which allows multiple instances of the component and/or subcomponent to be used at the same time. The architecture provides a both a design-time and programming interface, also referred to as a programmatic interface. The design-time interface provides the developer with an extensive, graphical environment that enables single-click and single entry definition of components and subcomponents.

The architecture and framework 103 automatically generates object-oriented code in the developer's environment, based upon the design-time and/or programmatic component and subcomponent definitions as defined by the developer. The architecture and framework 103 enables developers to communicate with third party sensors and then process the data into customized data structures via a plurality of components and subcomponents. Each system within the architecture and framework 103 can contain components and subcomponents, and employ methods, that allow the user to acquire raw sensor data and manage that data in a variety of ways, so as to allow the developer to develop a front-end for the end user in rapid way in an object-oriented programming language of their choice. This allows users to communicate with various sensors from different manufacturers and different SDKs and APIs and then to format and structure that data in such a way as to allow them to append custom fields, create custom data structures, export data structures, automatically insert custom data structures into a database and create the database, base a data structure off of another data structure, base a data structure off of a parameter and/or a return value of a wrapped function, merge custom data structures, group data structures, and provide data sourcing and binding to common IDE controls.

An exemplary embodiment of a reconfigurable hierarchical component based architecture and framework 103 for rapidly developing sensor device enabling software applications can comprise a rule based data structuring system 204 having at least one of a series component 401 and an associated field subcomponent 402; a series table system 207 having a series table component 701; and a system of acquiring data from a data provider. The architecture and framework 103 is particularly useful where the data contains at least some portion of sensor data. The rule based data structuring system 204 can be configured by user-defined relationships to exchange data with one or more of another rule based data structuring system 204, the system of acquiring data, the series table system 207, an object oriented wrapping system 203 having a command component 301 and/or associated parameter subcomponent 302, and a data filtering system 206 having a filter component 601 and/or an associated condition subcomponent 602. The user-defined relationships can established by embedding components of such listed systems within the rule based data structuring system 204 and/or by setting a single property value to link components of such listed systems with the series component 401 of the rule based data structuring system 204. For example, a link can be established by making a selection which associates the command component 301 of the object oriented wrapping system 203 with the series component 401 of the rule based data structuring system 204. Afterwards, there can be additional user-defined relationships established by similarly setting additional property values, but the initial setting established the overall relationship.

The associated subcomponents, e.g, the aforesaid field, parameter and condition subcomponents 602, are user-defined and are similarly embedded and/or linked in combination with a respective associated component thereof to establish the user defined relationships.

The rule based data structuring system 204 can further be similarly configured according to the user-defined relationships to exchange data with one or more of a data structure grouping and merging system 205 having a. sensor group component 501, an associated group series subcomponent 502, an associated existing field subcomponent 504 402, and/or an associated trigger subcomponent 503; a data device writer system 208 having an associated device writer component 801; and a network communications system 209 having a data sending component 901 and/or a data receiving component 902. The group series, existing field, and trigger subcomponents 503 can be user-defined and, can be embedded or linked, as described above, in combination with a respective associated component thereof to establish the user defined relationships. The user defined relationships can also be established among other systems in addition to just with the rule based data structuring systems 204.

The architecture and framework 103 provides data management and data aggregation for sensor devices. The architecture and framework 103 enables creation of one or more central device components 202, each of which acts as a logical sensor device or sensor device(s). In other words, each central device component is a logical representation of one or more sensors, or like devices. The central device component 202 can provide instructions to embed sub-components use a programming interface, use .a visual, design-time interface, and/or a data-binding interface. The central device component 202 can contain systems, components, and subcomponents, and employ methods, that seamlessly integrate into the architecture and framework 103 to allow for the sensor device data acquisition and management. A plurality of central device components 202 can be used at the same time in order to communicate and manage any number of sensor devices within the architecture and framework.

The central device component 202 enables developers to acquire, manage, and structure data for any given sensor in their application. The central device component 202 provides device management by providing a "container" for the various systems, collection of components, and collection of subcomponents needed to interact on behalf of a logical sensor. In an exemplary embodiment, the central device component 202 represents a sensor in a sensor network. As an example, in order to incorporate a sensor into an application, multiple matters need to be addressed so that the sensor can be incorporated in a highly customized application, including but not limited to:

communication and interaction with the sensor by utilizing functionality to allow direct insertion into data structuring systems and by automatically generating code to wrap and invoke unmanaged code and utilizing resulting values and parameters as data;

structuring of incoming "packetized", raw sensor data by determining defined and undefined structured data rules and 'splitting' and converting data into respective manageable sections;

storing the incoming sensor data;

processing of the sensor data into relevant values by breaking down the "packets" of information;

filtering of the incoming sensor data by comparing incoming processed and unprocessed data against defined filters and conditions;

automatically exporting of the sensor data to storage mediums by utilizing functionality to build a multitude of datastore structures using a minimal number of defined parameters then organizing and/or converting the sensor data and inserting it into the data store;

fusing of the sensor data to provide intelligent, processed data by creating in memory storage structures and combining data based off of a minimal number of selected rules;

customizing the sensor data structure (i.e. add fields, store only relevant portions of a data structure); and, communicating of the sensor data to other devices/applications by utilizing functionality to construct standardized and/or customized network communication protocols.

As a way to address the many obstacles of incorporating sensors into an application, the central device component 202 manages all of the various systems that are needed in order to fully integrate a sensor into an application. The central device component 202 does this by providing collections of components and subcomponents that define the exponential interactions that need to take place in order to incorporate a sensor into an application in the desired manner of the application developer. The central device component 202 houses all of the systems, components, and subcomponents for a particular sensor that a developer would want incorporated into an application. Basically, the central device component 202 houses all of systems, components, and subcomponents, and employs the methods defined in the systems in FIGS. 3 through 9, for a particular sensor in an application.

In addition, the central device component 202 is capable of utilizing sensor data and non-sensor data from a multitude of other data sources including datastores, web services, and network data.

The architecture and framework 103 allow developers to copy and paste central device components 202 in design-time, and provides cloning functionality for run-time to allow for the quick deployment and rapid development of many like sensor devices. The cloning functionality of the central device component 202 enables creation of a shallow copy of a logical sensor, including all defined components, subcomponents, and relationships, but without the accompanying data that is associated with the central device component 202 being cloned.

Event subscription to certain actions within the architecture and framework 103 can be subscribed to by any system component or subcomponent within the application, to allow the developer dynamic flexibility when creating a graphical user interface for the sensor device(s). The architecture and framework 103 inherits basic component base classes, whereby the architecture and framework 103 can take advantage of previously developed software in a component base class existing within the internal framework of the IDE in which the architecture and framework 103 resides, to ensure interface compatibility.

An exemplary embodiment of the reconfigurable hierarchical component based architecture and framework 103 can comprise one or more central device components 202, each having one or more of the rule based data structuring system 204, the system of acquiring data, the series table system 207, the object oriented wrapping system 203; the data filtering system 206, the data structure grouping and merging system 205, the data device writer system 208, and the network communications system 209. Each central device component 202 is basically a logical representation of one or more data providers, e.g., sensors. Multiple instances of the central device components 202 can be created, and each can be used at the same time.

The reconfigurable hierarchical component based architecture and framework 103 can further comprise an object oriented design component toolset having object template derivation tools for accessing and editing a set of object-based templates, such that the toolset utilizes inheritance of basic operational capability from a component base class existing within an internal framework of an IDE in which the reconfigurable hierarchical component based architecture and framework 103 resides. The toolset can enable establishment of the user-defined relationships between systems which comprise the central device component 202. The central device component 202 can include a visual representation thereof, a design-time interface to access the visual representation, a programmatic interface, and a data-binding interface. The aforementioned user-defined relationships can be established by setting the single property value via at least one of the design-time interfaces and the programmatic interfaces. Setting the single property value to link the series component 401 with other components of systems to be related to the rule base data structuring system can also include setting additional property values for the associated subcomponents of the components, and embedding components can also include embedding associated subcomponents of the components.

The reconfigurable hierarchical component based architecture and framework 103 can further comprise an object oriented design component toolset having object template derivation tools for accessing and editing a set of based object templates, such that the toolset utilizes inheritance of basic operational capability from a component base class existing within an internal framework of an IDE in which the reconfigurable hierarchical component based architecture and framework 103 resides. The toolset can enable establishment of the user-defined relationships between systems which comprise the central device component 202. The central device component 202 can include a visual representation thereof, a design-time interface to access the visual representation, a programmatic interface, and a data-binding interface. The aforementioned user-defined relationships can be established by setting the single property value via at least one of the design-time interfaces and the programmatic interfaces. Setting the single property value to link the series component 401 with other components of systems to be related to the rule base data structuring system can also include setting additional property values for the associated subcomponents of the components, and embedding components can also include embedding associated subcomponents of the components.

The design time interface can provide an extensive graphical environment for establishing the user-defined relationships via setting a single property value. However, establishing the user defined relationships, such as setting property values and/or embedding component and/or associated subcomponents, can be performed via one or more of the programmatic interface, and the design-time interface. The programmatic, design-time, and data binding interfaces can be separate interfaces.

One or more central device components 202 can also be saved as a software application program, wherein the software application program comprises common object-oriented code, and wherein the software application program is rapidly developed using a suite of the components and subcomponents of the aforesaid systems which employ the user-defined relationships that establish the exchange of data therebetween. The software application can be saved on a computer readable medium as instructions for causing one or more computer systems to emulate the saved central device component 202(s). As mentioned above, the basic operational capability of the systems, or components thereof, can be inherited from existing component base classes within the internal framework of an IDE in which such systems reside, such that the components inherit respective characteristics and properties from the existing component base classes to ensure interface compatibility by taking advantage of previously developed software.

Figure 3:
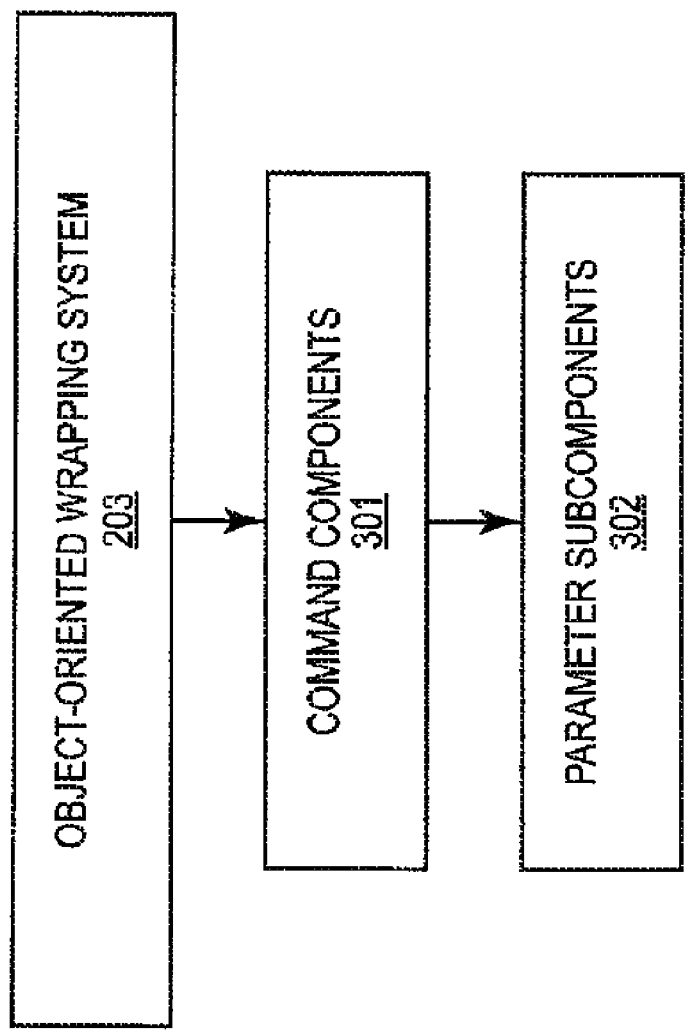
FIG. 3 is a block diagram illustrating the various components and subcomponents and the interaction between an Object-Oriented Wrapping System that may be executed by the embodiment shown in FIG. 2.

Referring now to FIG. 3, this block diagram illustrates the various components, subcomponents, and methods and the interaction between an embodiment of an object-oriented wrapping system 203 within an embodiment of the architecture and framework 103 of FIG. 1. The object-oriented wrapper system 203 allows developers to simplify the writing of enabling sensor device drivers from both managed and unmanaged dynamic link libraries. The wrappers of the dynamic link libraries are stored in separate assemblies within memory which eliminates the need for aliasing like DLL functions. The term "functions" as used herein, in relation to DLLs, is inclusive of subroutines. The object-oriented wrapping system 203 allows developers to provide default parameter values for the wrapped functions. The object-oriented wrapping system 203 allows for return values and wrapped function parameter values to be modified and related to data structuring components and subcomponents. This enables developers to automatically populate the series table system 207 with these related values when a command component 301 associated with a wrapped function is invoked. The object-oriented wrapping system 203 permits developers to invoke the command components 301 from the user's object-oriented integrated development environment. The object-oriented wrapping system 203 enables developers to perform callbacks of the command component 301 using delegate functionality, which allows callbacks to be initiated in various defined areas of an application.

The object-oriented wrapping system 203 can include a command component 301 and a parameter subcomponent 302. A plurality of command components 301 and parameter subcomponents 302 is permitted within an embodiment of the architecture and framework 202. Each wrapped function is assigned a command component 301, and each command component 301 can have an associated return value, unless the wrapped function is a subroutine, in which case there would be no return value. There can be multiple parameter subcomponents 302 associated with a command component 301, and each parameter subcomponent 302 can correspond to a wrapped function parameter value. The command component 301 enables developers to wrap third party SDKs and APIs. The command component 301 allows developers to specify the original equipment manufacturer command (e.g. function) name, the original equipment manufacturer file name (e.g. the third party SDK—in the file format of a .dll), the return data type (return value), an alias for the command component 301, and a plurality of parameter subcomponents 302 to define the parameters of the wrapped function. The parameter component 302 enables developers to define the specific parameter values that are needed in order to invoke the wrapped function. The command component 301 allows developers to specify the parameter data type, the parameter name, whether the parameter is being passed "by reference" or "by value", a default value, and whether or not the parameter is optional.

Various command components 301, and within in each command component 301—various parameter subcomponents 302—can be specified for a particular central device component 202. The object-oriented wrapping system 203 enables the developers to customize and define, to their liking, a number of command components 301 and parameter subcomponents 302 in order to be able to pull in sensor device data from multiple sensor devices, including heterogenous sensor devices. The object-oriented wrapping system 203 automatically generates the code needed to wrap each language in run-time and stores each wrapped function in a separate assembly within memory which eliminates the need for aliasing like function calls between different command components 301.

The object-oriented wrapping system 203 provides automated wrapping functionality that allows the application to read data from, and push out data to, a particular central device component 202. The object-oriented wrapping system 203 can provide this functionality based off of (upon) various simple, single-click properties that the developer (user) defines.

As an example, assume a sensor is collecting data and the application needs to read the sensor's data and break it down and store it into custom data structures so that the sensor can be incorporated into the IDE for application programming. In an exemplary embodiment, based upon various user-defined properties in the command component 301 and accompanying parameter subcomponent(s) 302, the object-oriented wrapping system 203 automatically wraps the specified function that is needed to communicate with the sensor so that the sensor and data can be incorporated into the IDE for application programming. The object-oriented wrapping system 203 would automatically generate the code necessary to wrap a function call based off of the defined properties in the command component 301 and parameter subcomponent(s) 302 and would then construct and compile the code during run-time within a separate assembly within memory. The object-oriented wrapping system 203 would then convert any default values that are specified by the developer, convert any structures to byte arrays (if needed), and then invoke the function based on any number of specified parameters.

After the function is executed, various events are raised that can be subscribed to by the developer or by other components within the application. After the function is executed the object-oriented wrapping system 203 checks to see if there are series components 401 (and correlating field subcomponents 402) in the rule-based data structuring system that are related to the particular command component 301 (and correlating parameter subcomponents 302) being invoked. If there is a related series component 401 in the rule-based data structuring system 204, then the object-oriented wrapping system 203 automatically communicates the incoming data transferred to the application (the incoming data is a result of invoking the wrapped function call) into the rule-based data structuring system 204 for further processing. The object-oriented wrapping system 203 enables developers to initiate this functionality by defining a few properties and writing a single line of code in their application.

In an exemplary embodiment, the object-oriented wrapping system can comprise a means (object oriented code) for automatically generating object-oriented class wrappers of DLL functions to simplify writing of device enabling programs from at least one of managed and unmanaged DLLs; means (object oriented code) for modifying wrapped functions of the DLLs; and means (object oriented code) for relating the wrapped functions to at least the rule based data structuring system 204 in accord with the user-defined relationships to exchange data This enables the series table data system to be automatically populated with the desired data The code required to, wrap the language for each of the wrapped functions can be automatically, generated in run-time.

Each wrapped function can be assigned a command component.301, typically only one command component 301 for each wrapped function, and a return value is typically associated with the, command function, unless the function is a subroutine, in which case there is no return value. In the context of this description, the term "function" encompasses subroutines. One or more parameter subcomponents 302 can also be associated with the command component 301, each of which corresponds to a wrapped function parameter value. The wrapped function parameters, or parameter values, is a user defined value for the wrapped function.

The means for modifying the wrapped function can include modifying the return value and/or the wrapped function parameter values, the means for relating the wrapped functions can include establishing the user-defined relationships between the command component 301 of the object oriented wrapping system 203 and the series component 401 of the rule based data structuring system 204.

Establishing the user-defined relationship can further comprise setting the single property value to link the series component 401 with the command component 301, which results in the field subcomponent 402 becoming linked to any parameter subcomponent 302(s) associated with the command component 301, and also to any wrapped function parameter values associated with the parameter subcomponents 302. Linking the series component 401 with the command component 301 also links the field subcomponent 402 with the return value typically associated with the command component 301.

In an exemplary embodiment, relationships can be established between the object oriented wrapping system 203 and the rule based data structuring system 204 via a return value of a command component 301 (or wrapped function), and/or via a parameter subcomponent 302 (or wrapped function parameter value). The wrapped function parameter values associated with the parameter subcomponents 302 can be changed/modified by invoking the wrapped function. Stated another way, the wrapped function parameter values are the values for the parameter subcomponents 302 that are changed as a result of invoking the wrapped function (i.e. invoking the command component 301 and associated parameter subcomponents 302). Users do not have to specify a default value (but can if they choose to), a user must, however, specify wrapped function parameter values (via the parameter subcomponent) that are required to run a wrapped function.

Figure 4:
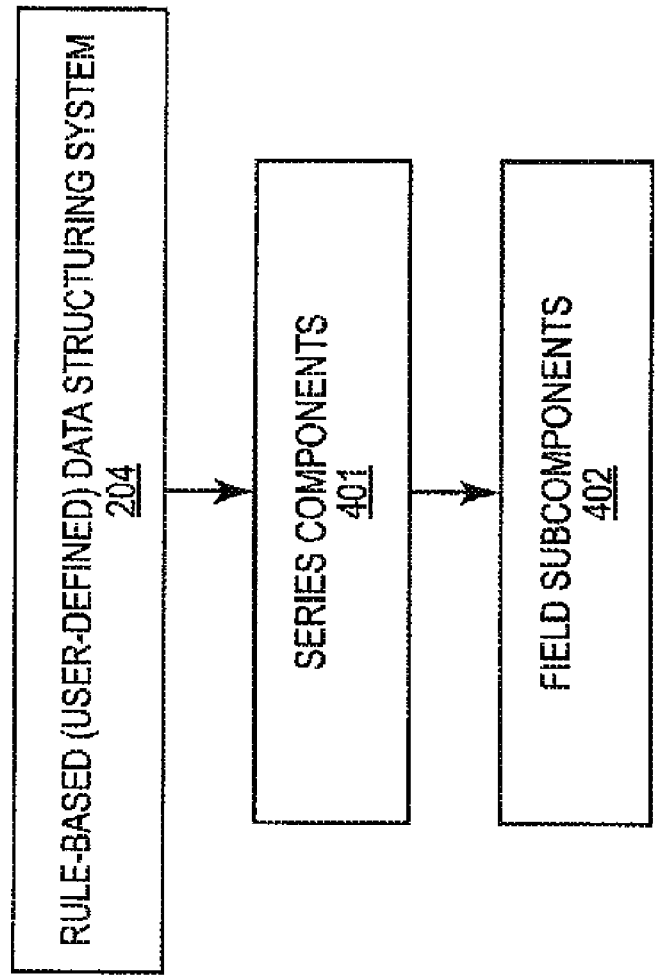
FIG. 4 is a block diagram illustrating the various components and subcomponents and the interaction between the Rule-Based (User-Defined) Data Structuring System that may be executed by the embodiment shown in FIG. 2.

Referring to FIG. 4, this block diagram illustrates the various components, subcomponents, and methods and the interaction between an embodiment of a rule-based (user-defined) data structuring system 204 within an embodiment of the architecture and framework 103 of FIG. 1. The rule-based data structuring system 204 allows developers to define custom data structures in order to allow them to manipulate, organize, and fuse data in such a way as to make it useful, in the context of providing an end-user software application. Once a data structure is defined for a central device component 202, then that data can be filtered, grouped, merged, stored, and can even be inserted automatically into a dynamically created custom data structure. The rule-based data structuring system 204 allows developers to define any number of custom data structures for a particular central device component The rule-based data structuring system 204 can include a series component 401 and field subcomponents 402 which define the manner in which sensor device data will be managed and allocated within the series table system 207 for a particular central device component 202. The rule-based data structuring system 204 provides developers with event-driven functions that allow the developer to programmatically invoke various data structuring functions.

The rule-based data structuring system 204 permits developers to relate a series component 401 to any command component 301 or another series component 401 within the same central device component 202. The rule-based data structuring system 204 permits developers to relate a field subcomponent 402 to any parameter subcomponent value, return value, or with another field, subcomponent 402 within the same central device component 202. The rule-based data structuring system 204 permits developers to define and append custom data fields (i.e. unique IDs, timestamps, etc.) to a series component's 401 related series table component 701 of the series table system 207 (described hereinafter in connection with the description of FIG. 7).

A plurality of series components 401 and field subcomponents 402 are permitted within an embodiment of the architecture and framework 103. The series component 401 enables developers to define custom data structures for a particular central device component 202. In one embodiment, a series component 401 could contain one or more field subcomponents 402. Multiple series components 401 can be defined for a particular central device component 202. Series components 401 act as the template for a related series table component 701, and the field subcomponents 402 act as a template for data columns within the related series table component 701. When incoming sensor device data is received, the rule-based data structuring system 204 allows developers to define the way in which that data will be broken out via the series components 401 and field subcomponents 402. The actual incoming sensor device data will be inserted into the defined custom data structure via series table system 207.

The rule-based data structuring system 204 provides a method to allow developers to customize a base template for incoming device data so that the when device data is being read from a sensor device it will populate rows of data into the related series table system 207 using the defined data structure (i.e. series component 401).

The series component 401 allows developers to specify a maximum amount of rows the related series table component 701 (contained in the series table system 207) can allow. A maximum row handler is provided to developers to enable them to specify what is to happen to the data in the related series table component 701 in the event the maximum rows allowed is reached. The rule-based data structuring system 204 allows developers to specify a plurality of series components 401 (e.g. tables) for a particular central device component 202 and a plurality of field subcomponents 402 to define the fields (e.g. columns) of a particular series component 401 (e.g. table). The series component 401 allows developers to apply filters to incoming sensor device data via the data filtering system 206. The series component 401 enables developers to establish a relationship to a specific command component 301 or another series component 401 within the same central device component 202.

The field subcomponent 402 allows developers to define the field (e.g. column) data type and whether or not the field (column) is a primary key (used in the data structure grouping and merging system 205, described hereinafter in connection with FIG. 5). The field subcomponent 402 allows developers to specify a relationship to either a specific command parameter subcomponent 302 or to another field subcomponent 402 within the same central component device 203, or a custom value. The field subcomponent 402 allows developers to specify what parts of the incoming device data will be used to populate the defined column in the related series table component 701 (within the series table system 207).

Various series components 401, and within in each series component 401—various field subcomponents 402—can be specified for a single central device component 202. The rule-based data structuring system 204 enables the developers to customize an define multiple data structures through series components 401 and field subcomponents 402. The rule-based data structuring system 204 automatically generates the code needed to manage, organize, and specify what and how data will be populated into the series table component 701 that is related to .a particular series component 401.

The rule-based data structuring system 204 provides custom data structuring capabilities by allowing a user of the present invention to define various properties about the way in which sensor data for a particular sensor, or data provider, is stored, including but not limited to, what incoming data is to be stored, how incoming data is stored, the way in which incoming sensor data is structured when being stored, what type of data is stored, and what relationship links are established in order to create efficient storage methods. The rule-based data structuring system 204 can directly interact with the data filtering system 206 via the filter components and condition subcomponents (described hereinafter in connection with FIG. 6).

As an example, assume a sensor is collecting data and the application has to read the sensor's data, break it down, and store it into custom data structures so that the sensor can be incorporated into the IDE for application programming. In an exemplary embodiment, a command component 301 (and its corresponding parameter subcomponents 302) invokes a read function on the sensor. The object-oriented wrapping system 203 checks to see if any series components 401 (and its corresponding field subcomponents 402) are related to the command component 301. The data structuring system 204 receives notification that a series component 401 within the same central device 202 component is related to the command component 301 that just invoked the read function. The data structuring system 204 can build a row of data based upon setting a single (user defined) property value, such as by a simple, single-click, and creates the row schema for its related series table component 701 based upon its corresponding field subcomponents 402. The row schema is created by adding multiple series table fields together to form a row of data that corresponds with each specified data type for every specified field subcomponent 402 within the related series component(s) 401. Additionally the series component 401 would then cause to be appended any additional specified custom fields to the row schema.

Once the schema is created, the data structuring system 204 defines the way in which the data being transmitted from the object-oriented wrapping system 203 will be broken down. The data structuring system 204 then acquires the transmitted data from the related command component 301, performs automatic data type conversions, breaks down the data into the various field formats that will be entered into the related series table component 701, and then checks the data filtering system 206 to determine if the incoming data is to be filtered. Once the actual sensor data is processed it is sent to an internal series table component 701 to be stored. The data structuring system 204 then checks to see if any other series components 401 (and any corresponding field subcomponents 402) within the data structuring system 401 are related to it, and then, if related, the process repeats itself Therefore, based off of one read function being performed, the object-oriented system 203 and the data structuring system 204 automatically identify a relationship and then automatically break-down, format, and then populate sensor data into a series table component 701. The data structuring system 204 thus provides virtually unlimited options to define custom data structures and relationships.

In the rule based data structuring system 204, the series component 401 and/or field subcomponent 402 can define a custom data structure for one or more sensors, or data providers, associated therewith. The series component 401 and/or field subcomponent 402 can define the manner in which data from the associated data providers will be formatted in the series table system 207. The rule based data structuring system 204 can include one or more of a means (object oriented code) for sending data from one rule based data structuring system 204 to another rule based data structuring system 204 and a means (object oriented code) for receiving data in one rule based data structuring system 204 sent from another rule based data structuring system 204.

The custom data structures can be defined based upon return values and/or the wrapped function parameter value. Custom data structures can be created based upon a previously created custom data structure, and can also be created from a previously created data structure, but with additional fields appended thereto. For example, the custom data structure can be created based upon a previously created custom data structure, with additional fields appended thereto, wherein the additional field is created based upon return values and/or wrapped function parameter values.

Additionally, events can be fired and subscribed to by subscribing ones of at least one of the series component 401 and the field subcomponent 402, with which the aforesaid user-defined relationships can be established to associate these components/subcomponents with the command component 301 and parameter subcomponents 302 of the object oriented wrapping system 203. This results in establishing relationship links between the associated return values and/or wrapped function parameter values and the custom data structure. Consequently, user-defined relationships can be established between a-multiple custom data structures simply by establishing user-defined relationships between the rule based data structuring systems 204.

The series component 401 and the field subcomponent 402 can thus be represented as logical components of one or more data providers having one or more associated/defined custom data structures. The series component 401 and/or the field subcomponent 402 can be cloned and/or serialized for run-time copy & paste functionality of the custom data structures. Copy & paste functionality of the custom data structures can also be provided in design-time.

Figure 5:
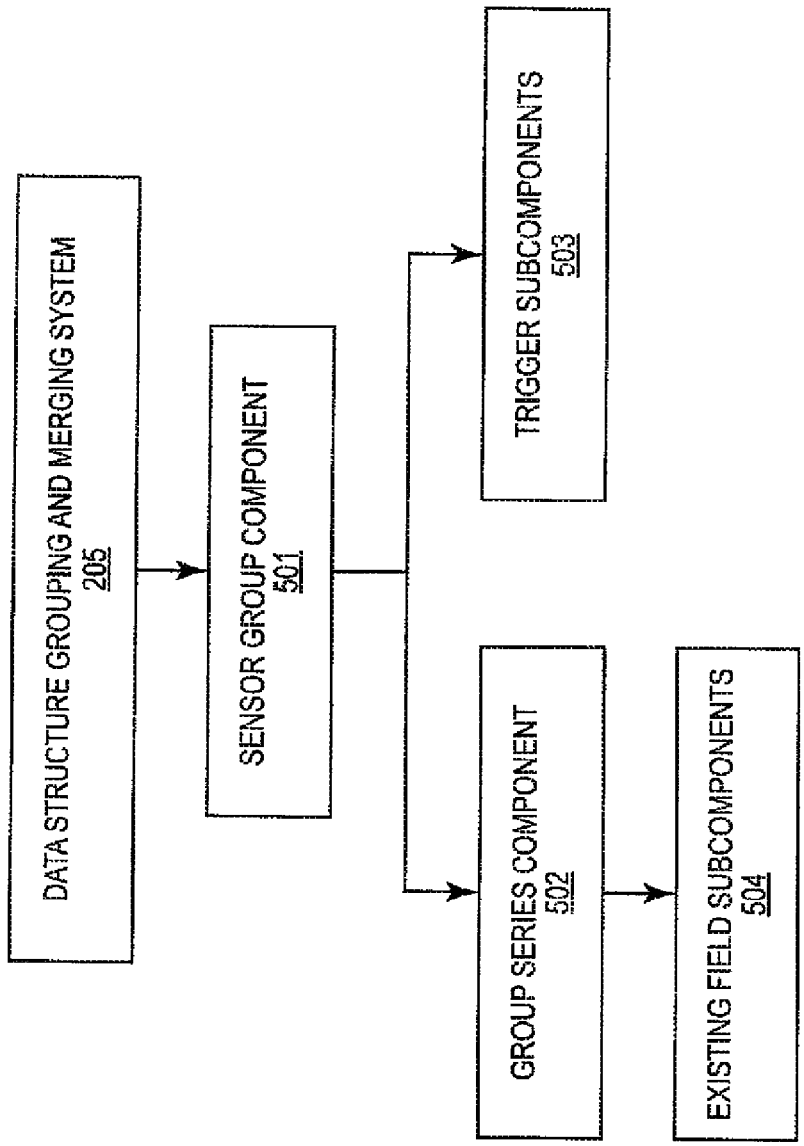
FIG. 5 is a block diagram illustrating the various components and subcomponents and the interaction between the Data Structure Filtering System that may be executed by the embodiment shown in FIG. 2.

Referring to FIG. 5, this block diagram illustrates the various components, subcomponents, and methods and the interaction between an embodiment of a data structure grouping and merging system 205 within an embodiment of the architecture and framework 202 of FIG. 2. The data structure grouping and merging system 205 allows developers to define new custom data structures from existing (previously defined) data structures in order to allow developers to manipulate, organize, and fuse/merge data in such a way as to make it useful, in the context of providing an end-user software application. The data structure grouping and merging system 205 allows developers to group various existing field subcomponents 504 within different central device components 203 into a sensor group component 501. A sensor group component 501 can contain a single group series subcomponent 501 (which acts in a similar manner as the series component 401 in the rule-based data structuring system 401). The data structure grouping and merging system 205 enables developers to add multiple, existing field subcomponents 504 from different central device components 203 for the purpose of performing event-driven merging (via a simple group), and bulk data merging (via a bulk group).

The data structure grouping and merging system 205 provides filtering capabilities on data (via the data filtering system 206) the same way as the data filtering system 206 filtering is applied to a series component 401 of the rule based data structuring system 204. Basically, the data structure grouping and merging system 205 creates a group series subcomponent 501 that is comprised of multiple existing field subcomponents 504. The data structure grouping and merging system 205 enables developers to group data from multiple sensor devices into one series table component 701 (within the series table system 207, described hereinafter in connection with FIG. 7). The data structure grouping and merging system 205 is defined by adding any number of existing field subcomponents 504 to a specific sensor group component 501 and then by specifying the type (e.g. purpose) of the group. The data structure grouping and merging system 205 allows developers to invoke a particular command component 302 for all of the central device components 203 included in the sensor group component 501 (in order for a central device component 202 to be included into a sensor group component 501, a central device component 202 has to have at least one of it's field subcomponents 402 included into the sensor group component 501).

The data structure grouping and merging system 205 is comprised of the sensor group component 501, the group series subcomponent 501, and a trigger subcomponent 503. Each sensor group component 501 can contain a single group series subcomponent 501 (which acts just like a series component 401 in the rule-based data structuring system 401). A sensor group component 501 allows the developer to define the type of the sensor group component 501 (i.e. a bulk group or a simple group). A plurality of sensor group components 501 can be used within an application. The group series subcomponent 501 allows developers to specify a maximum row setting for the group series' related series table component 701, and how to handle the event of the maximum row setting being reached. Filter components 601 and condition subcomponents 602 can be applied to the group series subcomponent 501 in the same manner in which they are applied to series components 401 in the rule-based data structuring system 401.

The data structure grouping and merging system 205 allows developers to merge data from the existing field subcomponents 504 included in the group series subcomponent 501. The data structure grouping and merging system 205 allows developers to define when to add a row of data to the group series subcomponent's related series table component 701 based off of trigger subcomponents 503. The sensor group component 501 enables developers to define a plurality of trigger subcomponents 503 that allow the developer to define when a row is to be added to the group series subcomponent's related series table component 701 (i.e. when a particular series component's related series table component 701 gets a row of incoming device data). The trigger subcomponent 503 allows developers to define when to add rows of data to the group series' related series table component 701 by specifying an included series component 401 which will act as the trigger for adding rows (in order for a series component 401 to be included into the sensor group component 501, a series component 401 has to have at least one of its field subcomponents 402 included into the sensor group component's existing field subcomponents 504). The trigger subcomponent 503 allows developers to define the event in which a row should be added (i.e. a series component's related series table component 701 gets a new row of data, therefore add a row of data to the group series subcomponent's related series table component 701).

The data structure grouping and merging system 205 allows developers to invoke a bulk merge method that will merge the included existing field subcomponents 504 based off a primary key. Therefore, for each series component 401 that is included in the sensor group component 501 at least one of it's existing field subcomponents 504 must have a primary key that is used to merge the data from the included existing field subcomponents 504 (in order for a series component 401 to be included into a sensor group component 501, a series component 401 has to have at least one of it's field subcomponents 402 included into the sensor group component's existing field subcomponents 504).

Basically, the data structure grouping and merging system 205 allows developers to obtain portions of various data structures found within the application into a single, unified data structure. The data structure and grouping system 205 fuses data from various predefined custom data structures based upon various events specified by the developer, or based upon developer-invoked merging functions. The data structure and grouping system 205 provides data fusing capabilities by defining what portions of data structures are used to comprise the grouped data structure, communicating with the included central device components in the application, and catching events from the included central device components (via the trigger subcomponents) that specify when to add a row of data to the group series subcomponent's 502 related series table component 701.

As an example, assume there are three sensors collecting and sending data to the application. The reading of the sensor data is invoked by the object-oriented wrapping system 203, and then passed on to the data structuring system 204 for structuring and processing, and then stored within the series table system 207. Each of the sensors may send several different types of data (i.e. temperature, picture, GPS coordinates, etc.). The developer may want to retrieve the current temperature values for each sensor every time anyone of the sensors gets a row added to their series table component 701 and store them in a single, unified series table component 701. In an exemplary embodiment, the developer could add the corresponding temperature existing field subcomponents 504 to the sensor group component 501. Once the desired existing field subcomponents 504 (i.e. temperature readings) are added to the sensor group component 501, the data grouping and merging system 205 automatically includes the central device components 202 and series components 401 that correspond with the included existing field subcomponents 504. The sensor group component 501 can then automatically subscribe to various events that correspond with the included field subcomponents 402 via the trigger subcomponents 503. Developer-defined trigger subcomponents 503 specify that when a row of data is added to the included existing field subcomponent's 504 related series table component 701, that a row of data needs to be added to the sensor group component's 501 group series subcomponent's 502 related series table component 701. A row of data is added to an included existing field subcomponent's 504 related series table component 701, and then the sensor group component 501 checks to see if there is a trigger subcomponent 503 that, corresponds with the series component 401 that just received a row of data.

The trigger subcomponent 503 notifies the group series subcomponent 502 that an included existing field subcomponent 504 just received a row of data, and therefore the group series subcomponent 502 must to structure a row of data for insertion into the group series subcomponent's 502 related series table component 701. The group series subcomponent 502 automatically obtains the current values of the included existing field subcomponents 504 and structures a row of data to be inserted based off of the existing field subcomponents 504 defined structures (defined in the data structuring system 204). The group series subcomponent 502 then checks to see if any filter components 601 are defined for the group series subcomponent 502. If there are any filter components 601 then the structure data row will be sent to the data filtering system 206 for filtering, then it will be sent the series table system 207 for insertion into the related series table component 701.

The previous example describes just one aspect of the data structure grouping and merging system 205. The data structure grouping and merging system 205 can also perform developer-invoked bulk merge functions that take the existing field subcomponents 504 and determine the primary keys defined and merge the various existing field subcomponent 504 data based upon a primary key(s). This is particularly useful for merging data from various sensors in the application based upon a primary key, such as a date/time. In addition the data structure grouping and merging system 205 can run command components 301 for all the central device components 202 included in the sensor group component 501. The sensor group component 501 houses all of the various components and defines the interactions between all of the components in the data structure grouping and merging system 205.

In an exemplary embodiment, the data structure grouping and merging system 205 can include a sensor group component 501, group series component 401, and/or an existing field subcomponent 504 402, which define a merged data structure comprised of at least a portion of one or more custom data structures previously defined by the rule based data structuring system 204. As used herein, the term "merged" can be used interchangeably with the terms "grouped" and "fused" in regard to custom data structures defined by the data structure grouping and merging system 205. One or more of the sensor group component 501, group series component 401, and existing field subcomponent 504 402 can define the manner in which the merged data structure is formatted in the series table system 207.

In an exemplary embodiment, the user-defined relationships are established between the sensor group component 501 and the series component 401 of the rule based data structuring system 204 to define the merged data structure. Additionally, establishing the user-defined relationships can include embedding the field subcomponent 402 of the rule based data structuring system 204 in the existing field subcomponent 504 402 of the data structure merging and grouping system. The merged data structures can also be defined based upon an event subscription by subscribing ones of the series component 401 and/or field subcomponent 402 of the rule based data structuring system 204. In such an embodiment, the data structure grouping and merging system 205 can include a trigger subcomponent 503 associated with the group sensor component. In an exemplary embodiment, the trigger subcomponent 503 can be associated with a series component 401 or the sensor group component 501, and the group series subcomponent 502 can have a user-defined relationship established with the rule based data structuring system 204 via at least the subscribing series component 401, such that defining the merged data structure based upon events can be enabled.

The merged data structures can be defined based upon common primary keys, and the grouping of multiple merged data structures can be based upon group function calls.

Figure 6:
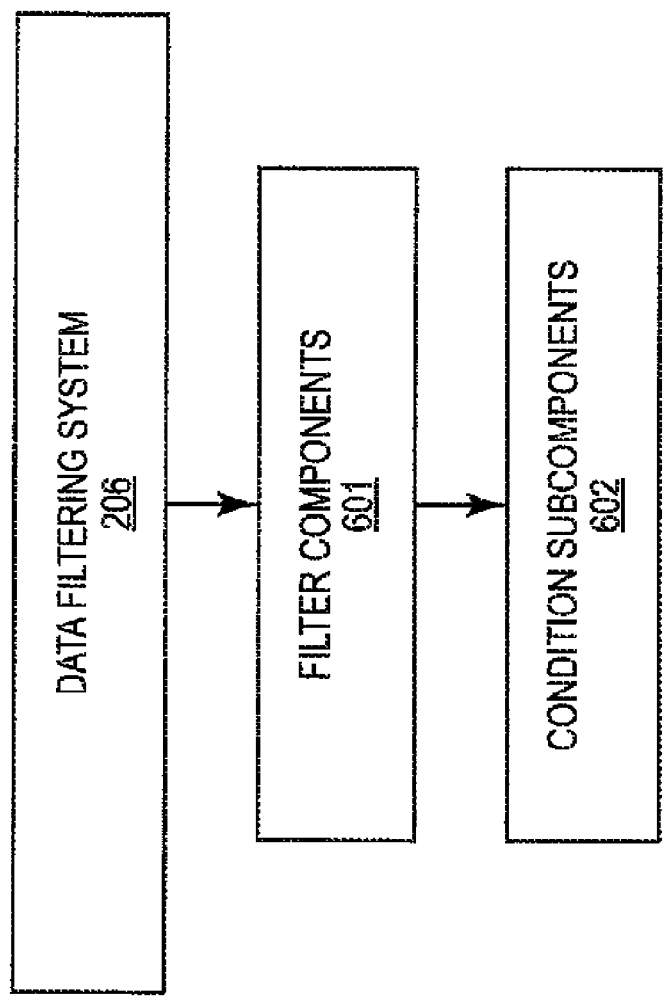
FIG. 6 is a block diagram illustrating the various components and the interaction between the Data Structure Grouping and Merging System that may be executed by the embodiment shown in FIG. 2.

Referring to FIG. 6, this block diagram illustrates the various components, subcomponents, and methods and the interaction between an embodiment of a data filtering system 206 within an embodiment of the architecture and framework 103 of FIG. 1. The data filtering system 206 allows developers to filter incoming sensor device data from being transmitted to the series table system 207 for a particular series component 401. The data filtering system 206 allows developers to filter incoming data using a plurality of filters (via the filter components 601) and a plurality of conditions (via the condition subcomponents 602) for a particular filter component 601. The data filtering system 206 allows developers to establish multiple "or-ing" filter conditions (i.e. if x or x then filter the incoming data) via the filter component 601, and it allow developers to establish for multiple "and-ing" filter conditions (i.e. if x and x then filter the incoming data) via the condition subcomponent 602. The data filtering system 206 allows developers to define custom filters based upon common conditional operators (i.e. <, >, =, etc.) and bitwise operators (i.e. And-ing, NAnd-ing, and Masking).

The data filtering system 206 can include a filter component 601 and a condition subcomponent 602. A plurality of filter components 601 and condition subcomponents 602 are permitted within an embodiment of the architecture and framework 202. The filter component 601 enables developers to establish a plurality of condition subcomponents 602 for the particular filter component 601, and whether or not the filter component 601 is enabled. Each individual filter component 601 is treated as an "or-ing" operation, meaning that if any one of a number of filter component's are met, then the data will be filtered. In contrast the condition subcomponent 602 is treated as an "and-ing" operation, meaning that if all of the condition subcomponents for a particular filter component 601 are met then the data will be filtered The condition subcomponent 602 enables developers to define a specific filtering condition for a particular filter component 601. The conditions subcomponent 602 allows developers to specify what data field is being filtered, what the condition operation is (i.e. =, <,>, etc.), whether or not to apply a not operation (i.e. if not x=6 then filter data), and the value the field being filtered is compared against (a user-defined value or the value of a particular field). The condition subcomponent 602 allows developers to filter data related to field subcomponents 402 that have a data type of "byte" through user-defined bitwise operations (i.e. And-ing, NAnd-ing, and Masking). Various filter components 601, and within each filter component 601—various condition subcomponents 602—can be specified for a single series component 401. The data filtering system 206 enables developers to customize filters to regulate the incoming sensor device data for a particular series component 401 and its related series table component 701.

The data filtering system 206 provides filtering capabilities for sensor data that is associated with a series component 401 and its related series table component 701. In addition, the data filtering system 206 is capable of filtering sensor data and non-sensor data from a multitude of other data sources including datastores, web services, and network data. The data filtering system 206 can work in direct conjunction with the data structuring system 204 and/or the data structure grouping and merging system 205 via the series component 401 and/or the group series subcomponent 502. Any number of filters can be defined for a particular series component 401/group series subcomponent 502. The data filtering system 206 filters incoming series component 401 data after it enters the data structuring system 204/data structure grouping and merging system 205, but before it actually gets stored in the series 401/group series subcomponent's 502 related series table component 701.

As an example, assume a sensor is collecting data and the application is invoking read functions to obtain the data to the application via the object-oriented wrapping system 203. The sensor data is sent to related data structuring system 204 for eventual insertion into the series table system 701. Before the data is actually stored in the series table system 207, the data structuring system 204 checks to see if there are any filters associated with the series component 401 that the sensor data is associated with. In an exemplary embodiment, a series component 401 has just received notification from a related command component 301, and data is being sent to the data structuring system 204 for processing. Once the data is processed and structured, the data structuring system 204 checks to see if there is any filter components 601 defined for the series component 401. The data filtering system 206 receives notification that an incoming series component's 401 data has a filter(s) defined in order minimize the storage of redundant information into the series table system 207. The data filtering system 206 receives the structured data row (structured via the data structuring system 204) before it gets sent to the series table system 207 to be stored in a series table component 701. The data filtering system 206 loops through all the filter components 601 associated with the series component 401. The data filtering system 206 then loops through all of the condition subcomponents 602 associated with a particular filter component 601. Each condition subcomponent 602 is a user-defined expression that is applied to a field value in the structured data row. The condition subcomponent 602 evaluates the specified expression by performing a common operation (e.g. if field value (1) is greater than or equal to 17).

The data filtering system 206 automatically provides only the filtering condition operations that are applicable to the particular field value being filtered (i.e. if the data type for the field value is byte', then the data filtering system 206 only provides And-ing, NAnd-ing and equals conditional operators). Based upon the user-defined condition subcomponent 602, the data filtering system 206 evaluates the expression and determines if it is 'True' or 'False'. If the condition subcomponent 602 is found to be 'False' then the remaining condition subcomponents 602 associated with the filter component 601 will be ignored, and the next filter component 601, if any, is evaluated. If the condition subcomponent 602 is found to be 'True', then the next condition subcomponent 602, if any, is evaluated. If all of the condition subcomponents 602 are found to be 'True' for a filter component 601, then the filter component 601 is found to be 'True', and the structured data row is filtered (i.e. not sent to the series table system for storage). In the case of multiple filter components 601 being associated with a series component 401, only one of the filter components 601 needs to be found 'True' in order for the structured data row to be filtered. The data filtering system 206 applies to group series subcomponents 502 in the same manner as the series components 401. The data filtering system 206 provides an unlimited amount of ways to define various filters that can apply to a structured data row provided by the data structuring system 204. The data filtering system 206 allows developers to detect any number of anomalies, detect threats and abnormal readings, and eliminate the data overload problems that are common to sensor-based applications.

In an exemplary embodiment, the data filtering system 206 can include a user defined expression to filter data, and the data to be filtered can be defined by user defined relationships established between the data filtering system 206 and one or more of the rule based data structuring system 204 and the data structure grouping and merging system 205. The user-defined expression can be a user-defined bitwise operational filter condition and/or a common conditional operator. The bitwise operational filter condition can be one or more of And-ing, NAnd-ing, and Masking. The common conditional operators can be one or more of <, >, =, contains, left-most contains, and right-most contains. Additionally, NOT operations can be applied to the common conditional operators.

In an exemplary embodiment, the user defined relationships can be established by embedding the filter component 601 in the rule based data structuring system 204 and the data structure grouping and merging system 205. Embedding the filter component 601 with the field subcomponent 402 of the rule based data structuring system 204 and/or the group series subcomponent 502 of the data structure grouping and merging system 205 results in associated custom data structures, defined by the rule based data structuring system 204, and/or merged data structures, defined by the data structure grouping and merging system 205, being filtered by the data filtering system 206.

Figure 7:
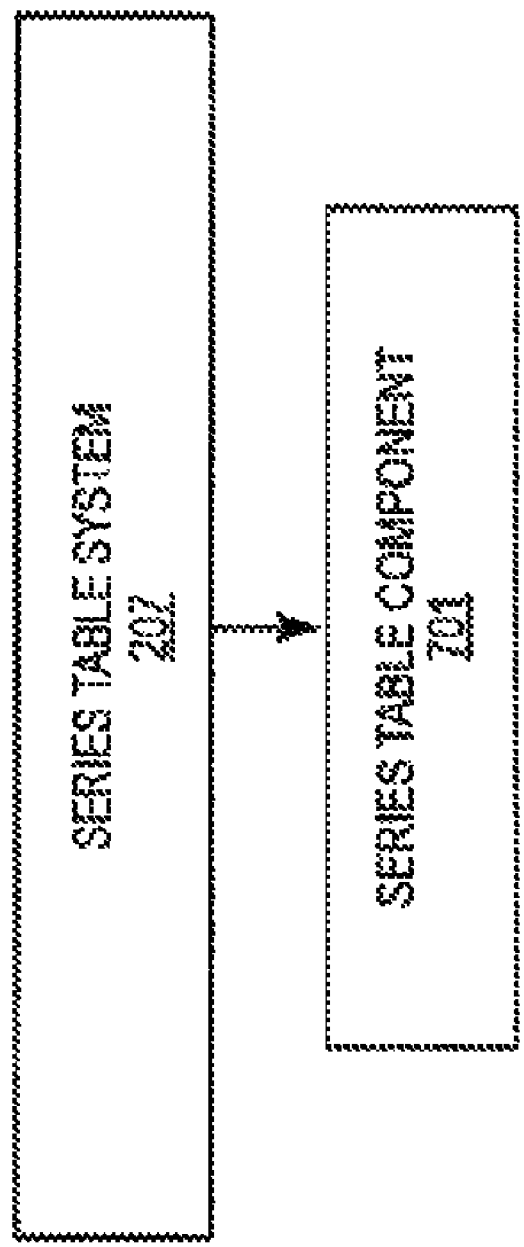
FIG. 7 is a block diagram illustrating the component and methods and the interaction between the Series Table System that may be executed by the embodiment shown in FIG. 2.

Referring to FIG. 7, this block diagram illustrates an embodiment of a component and various methods and the interaction between an embodiment of a series table system 207 within an embodiment of the architecture and framework 202 of FIG. 2. The series table system 207 acts as the in-memory data storage layer that stores all of the series table components 701 for every series component 402 and group series subcomponent 502 in the application. The series table system 207 allows developers to data bind to common IDE controls, and also to export a series table component 701 to a database or a data file. The series table system 207 is where the incoming device data is stored in memory. The rule-based data structuring system 204 defines how a particular series table component 701 is defined. The series table system 207 uses the rule-based data structuring system 204 series components 401 and subcomponents 402 to form the rows and columns of the in-memory table. As new data is transmitted to a particular series component 401 the related series table component 701 will store the structured data row after it has been processed by the data structuring system and (if needed) the data filtering system. The series table system 207 automatically performs behind-the-scenes data type conversions for the developer.

The series table system 207 can include a plurality of series table components 701. Series table components 701 consist of columns and rows. A series component 401 and its corresponding field subcomponents 402 in the rule-based data structuring system 204 define the actual structure for a particular series table component 701. The series table component 701 allows developers to manage sensor device data in the form of a table and allows them to export and dynamically created databases based off of these structures. The series table component 701 allows developers to data source and data bind a particular series components 401 data or a particular group series subcomponents 502 data within the application.

The series table system 207 can include all of the series table components 701 that are related to series components 401 within a central device component 202. The series table component 701 is representative of the in-memory data storage layer for each series component 401 within a central device component 202. The series table component 701 is defined by the series component 401/group series subcomponent 502 properties. Basically, the series table component 701 provides developers a way to access data related to a particular series component 401/group series subcomponent 502 within the application for programming/exportation purposes.

As an example, assume a sensor is collecting data and sending data to the application via the object-oriented wrapping system 203. Once the data is structured, processed, and filtered (via the data structuring system 204, data filtering system 206, and/or data grouping and merging system 205), it is sent to the series table system 207 for storage. The series table component 701 automatically creates the in-memory table in which a series component's 401/group series subcomponent's 502 data is stored. The series table component 701 creates the table based off the developer defined properties specified in the series components 401 and corresponding field subcomponents 402. The series table component 701 automatically converts data into the proper data type, and then populates the table with a row of data The series table component 701 can then be referenced by the developer for data binding and data sourcing to common controls (i.e. datagridview), or it can be referenced by the data device writer system 208 for automatic exportation to a developer defined database table or data file. The series table system can also automatically send data to the data structuring system 204 if another series component 401 is related to the series component 401 that just sent the data to the series table system 207. Basically, the series table system 207 is the data storage layer that provides developers with a way to access series component 401/group series subcomponent 502 data.

In an exemplary embodiment, the series table system 207 comprises an in-memory data storage layer for each custom data structure, and the custom data structure can be exported via the table series system to a database and/or a data file via the establishment of the aforesaid user-defined relationships. The in-memory data storage layer can further comprise an in-memory data storage layer for each series component 401 of the rule based data structuring system 204. The user can define a maximum number of rows for each the in-memory data storage layer, and user-defined rules establish management of incoming data after the maximum number of rows has been exceeded.

The series table system 207 can include means (object oriented code) for data binding and/or data sourcing to common IDE controls and/or visual interfaces. The user-defined relationships enable the data binding and/or data sourcing the custom data structures to common IDE controls and/or visual interfaces. The data sourcing and/or the data binding can be performed via the establishment of the aforesaid user-defined relationships among the series table system 207, the rule based data structuring system 204 and/or the data device writer system 208. In an exemplary embodiment, the user-defined relationships are established between the series table component 701 of the series table system 207 and each of the series component 401 of the rule based data structuring system 204 and the device writer component 801 of the data device writer system 208.

Figure 8:
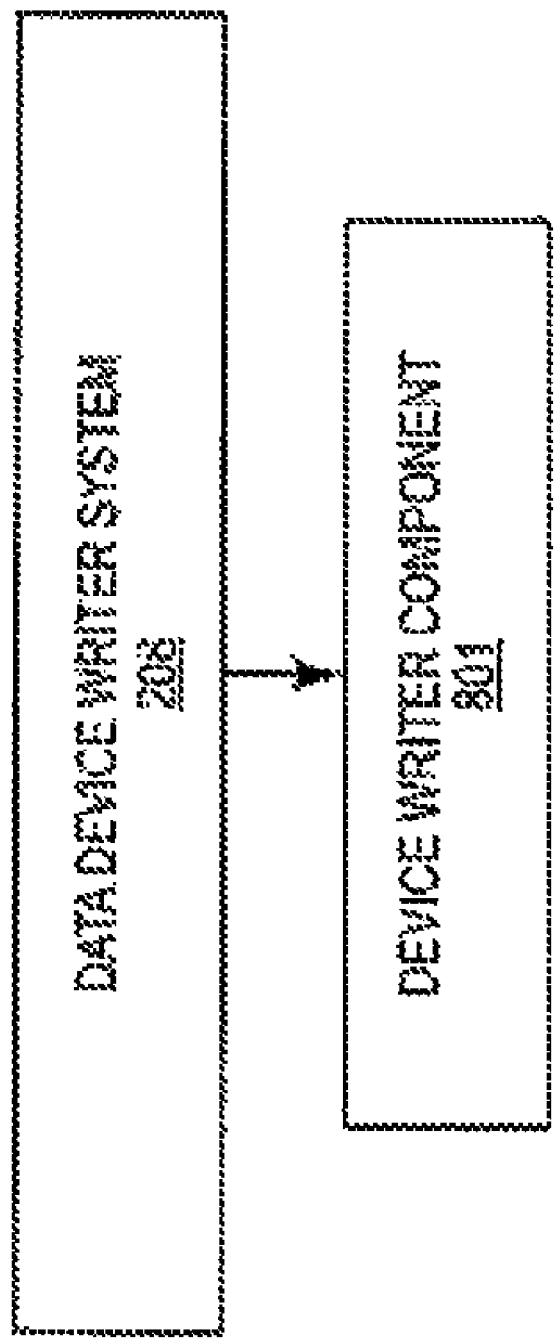
FIG. 8 is a block diagram illustrating the component and methods and the interaction between the Data Device Writer System that may be executed by the embodiment shown in FIG. 2.

Referring to FIG. 8, this block diagram illustrates the various components, subcomponents, and methods and the interaction between an embodiment of a data device writer system 208 within an embodiment of the architecture and framework 202 of FIG. 2. The data device writer system 208 allows developers to automatically create databases having tables and/or data files based off of a series component's or group series subcomponent's related series table component 701. The data device writer system 208 enables developers to automatically create databases in common formats and to also automatically insert data into these created databases. The data device writer system 208 enables developers to automatically create data files in common formats and to also automatically insert data into these created data files.

The data device writer system 208 can include a device writer component 801. The device writer component 801 allows developers to specify a connection string or to specify connection parameters that automatically generate the connections string. The data device writer system 208 directly interacts with a series table component 701 within a series table system 701 (whether it is a group series subcomponent's related series table component 701 or a series component's related series table component 701).

The data device writer system 208 performs all the behind the scenes creation and insertion functions that need to take place in order to export a series table component 701 into a database table or a data file. Based on a few developer defined properties, the data device writer component 801 automatically populates a database table/data file with a row of data every time the related series table component 701 is populated with a row of data The data device writer component 801 automatically sets the default provider, creates the connections string, connects to the database/data file, checks if the database table/data file exists, creates the database table/database file if it doesn't exist, maps the series table component data types to the specified database/data file format, and then builds and adds a row of data to the data base table/data file.

As an example, assume a sensor is collecting and sending data to the application (via the object-oriented wrapping system 203, data structuring system 204, data filtering system 206) and storing the data (via the series table system 207). The developer wants to automatically create a database table and insert data based off of a series table component 701 (i.e. every time the series table component 701 gets a row, the database table gets a row of the exact same data inserted into the created database table). The data device writer system 208 automatically interacts with the developer defined database by connecting to the database, using automatically generated connection strings, automatically provided provider drivers, and by mapping the data types between the series table component 701 and the database table. Therefore, just by defining a few properties, the developer can automatically insert data into a database just by enabling a data device writer component 801. The data device writer system 208 provides an automated way to create and insert data into databases and data files where the data can be further manipulated by applications programming or other applications.

In an exemplary embodiment, the data device writer system 208 can include user-defined relationships established between the device writer component 801 thereof and the series table component 701 of the series table system 207. This enables the data device writer system 208 to populate common database tables and/or common data files with a row of data responsive to the series table component 701 being populated with a row of data. By virtue of user defined relationships, the data device writer system 208 can automatically interact with a user-defined database by connecting to the database using at least one of automatically generated connection strings and automatically provided provider drivers, and by mapping the data types between the series table component 701 and the device writer component 801.

Additionally, the user-defined relationship can be established between the device writer component 801 and at least the series component 401 of the rule based data structuring system 204, such that common databases and/or common data files can be automatically populated based upon events subscribed to by at least the series component 401.

Figure 9:
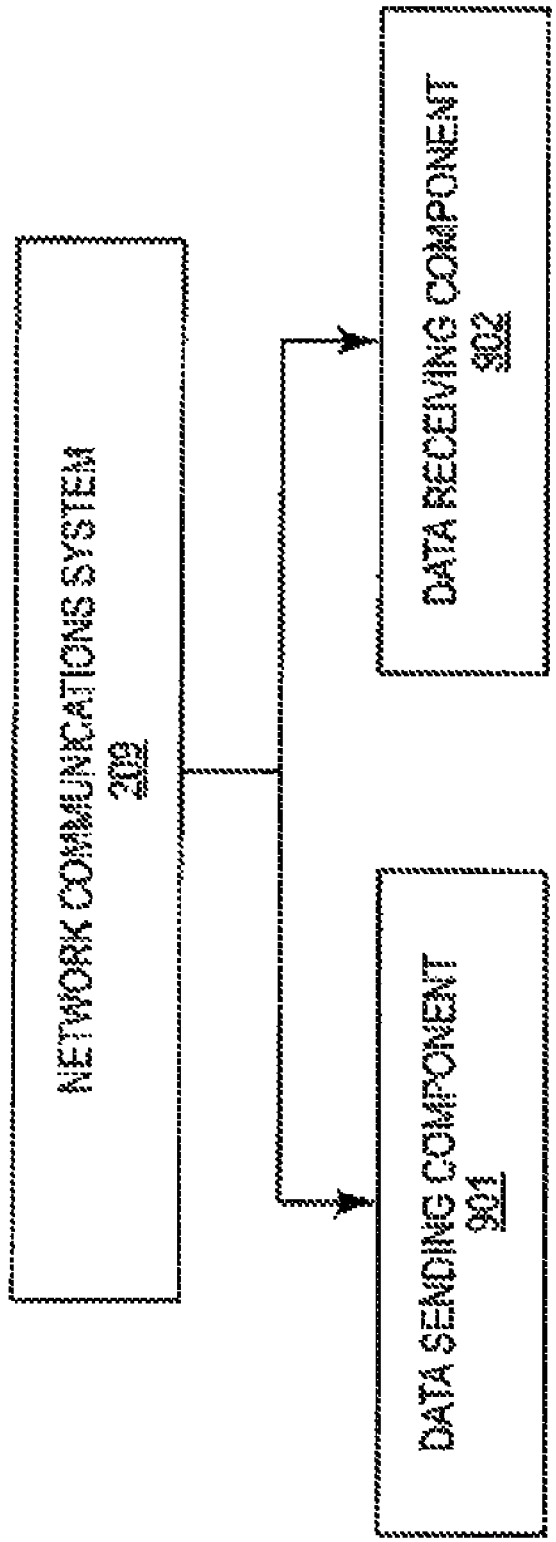
FIG. 9 is a block diagram illustrating the component and methods and the interaction between the Network Communication System that may be executed by the embodiment shown in FIG. 2.

Referring to FIG. 9, this block diagram illustrates the various components, subcomponents, and methods and the interaction between an embodiment of a network communications system 209 within an embodiment of the architecture and framework 202 of FIG. 2. The network communications system 209 allows developers to automatically send data across a WAN/LAN from the series component's or group series subcomponent's related series table component 702 to other like system instances. The network communications system 209 enables developers to send and receive data across using different IP protocols including TCP/IP and UDP protocols in IPv4, IPv6, and other standards.

The network communications system 209 can include a data sending component 901 and/or a data receiving component 902. The data sending component 901 and a data receiving component 902 allows developers to specify a network address, port, and packet size to allow easy communication between multiple systems. The data sending component 901 directly interacts with a series table component 701 within a series table system 207 (whether it be a group series subcomponent's 502 related series table component 701 or a series component's 401 related series table component 701) and can send data to a data receiving component 902 when manually called upon to do so or automatically by subscribing to internal events from the series table component 702. The data receiving component 902 can be set to a listening state and await data packets from the data sending component 901. Upon receiving data, the data receiving component 902 can automatically forward the data on to a specified rule-based data structuring system 401 where the data can be utilized.

As an example, assume a sensor has an application (created via the architecture and framework 103) running at-point on the sensor's operating system. The sensor collects and receives data and transmits processed data to another sensor with the same application running at-point on its operating system, which then transmits its processed data to a central command station. The network communications system 209 can automatically "packetize" a specific series table component's data in such a way that it can directly communicate with other sensors/devices that are running the application on their respective operating systems without having to continually wrap the functions to interact with the sensor. The network communications system 209, based on a few developer (user) defined properties, can automatically convert a series table component's 701 data into TCPIIP or UDP data packets for use by various devices (i.e. other sensors running the application, the internet, an intranet, a central command station, etc.). The data sending component 901 would automatically "packetize" the data that needs to be transferred based on the developer defined properties. The data receiving component 902 would automatically allow for the communication of sensor data to other sensors running the application (using the present invention)—bypassing the object-oriented wrapping system 203, and inserting the sensor data directly into the data structuring system 204. The network communications system 209 provides numerous ways in which sensor data can be transmitted, and exponential ways in which sensor data can be implemented on any device that can receive TCP/IP and/or UDP packets.

In an exemplary embodiment, the network communications system 209 can include user-defined relationships established between the data sending component 901 and/or the data receiving component 902 thereof, and at least the series table component 701 of the series table system 207. Data associated with the series table component 701 can be automatically packetized into a format acceptable to devices which send or receive such data. In an exemplary embodiment, the user-defined relationship can be established between the data sending component 901, and/or the data receiving component 902, and the series component 401 of the rule based data structuring system 204.

The custom data structures, or portions thereof, as defined by the series table system 207, can also be transferred and received based upon an event subscription and/or manually invoked function calls. In an exemplary embodiment, the sending and/or receiving of packetized data is based upon an event subscription by subscribing series components 401, subscribing field subcomponents 402. The packetized data can be sent and received over WAN/LAN networks using network protocols, wherein the network protocols can include TCP/IP and UDP. The network protocols can support at least one of IPv4, IPv6, and like standards.

While various embodiments of the present invention have been described herein, it is to be understood that such embodiments have been presented by way of example only, and not limitation. It will be apparent to persons skilled in the relevant art(s) that various changes in form and detail may be made therein without departing from the spirit and scope of the present invention. This is especially true in light of technology and terms within the relevant art(s) that may be later developed. Thus, the present invention should not be limited by any of the above-described exemplary embodiments, but should be defined only in accordance with the scope of the associated claims and any equivalents.

What is claimed is:

1. A non-transitory computer-readable medium storing a computer program providing a reconfigurable hierarchical component-based toolset for rapidly developing sensor device software applications on a computer, said computer program comprising program instructions to:
  define said toolset as comprising a series component defining a data storage format for a sensor data table, at least one field subcomponent defining a column of the sensor data table, and a series table component defining said sensor data table; and
  generate linked collections of series components, field subcomponents and series table components to define one or more data flows for sensor data said linked collections being generated as object-oriented code in a developer environment in response to user input.

2. The non-transitory computer readable medium of claim 1, wherein said program instructions to generate linked collections of series components, field subcomponents and series table components further include program instructions to:
  receive said user input via at least one of a visual interface or a programmatic interface; and
  define the linked collections of series components, field subcomponents and series table components as being contained in one or more central device components, each central device component thereby defining one of said data flows for a user-specified sensor device.

3. The non-transitory computer readable medium of claim 1, wherein said linked collections include series components, field subcomponents and series table components connected via a plurality of links, and wherein said user input is received in a graphical development environment that enables single-click definition and single entry definition of each of said plurality of links.

4. The non-transitory computer readable medium of claim 1, wherein each of said data flows for sensor data includes a source of raw sensor data and an output for processed sensor data being connected via at least one of said linked collections of series components, field subcomponents and series table components.

5. The non-transitory computer readable medium of claim 1, wherein said computer program further comprises program instructions to:
  define said toolset as including one or more group series subcomponents each defining a table row schema, and a sensor group component defining a collection of one or more group series subcomponents; and
  generate a linked collection of group series subcomponents and a plurality of field subcomponents in response to user input, each of the group series subcomponents defining a table row schema that includes field subcomponent columns from one or more series components.

6. The non-transitory computer readable medium of claim 5, wherein said computer program further comprises program instructions to:
  define said toolset as including a trigger subcomponent;
  assign a condition to the trigger subcomponent in response to user input; and
  generate a linked collection of trigger subcomponents and selected sensor group components in response to user input, such that the selected sensor group component conditions creation of a table row as defined by the table row schema on the condition assigned to its linked trigger subcomponent being satisfied.

7. The non-transitory computer readable medium of claim 5, wherein at least one group series component defines a custom data field to be appended to the table row schema.

8. The non-transitory computer readable medium of claim 7, wherein the custom data field is a unique ID or a timestamp.

9. The non-transitory computer readable medium of claim 1, wherein said computer program further comprises program instructions to:
  define said toolset as including a command component defining a wrapper for a dynamic link library (DLL) function; and
  generate linked collections of command components and series components in response to user input, each command component wrapping its associated DLL function as a source of sensor data for its linked series component in one of said data flows for sensor data.

10. The non-transitory computer readable medium of claim 9, wherein said computer program further comprises program instructions to:
  define said toolset as including at least one parameter subcomponent defining a parameter of the wrapped DLL function; and
  generate linked collections of command components and parameter subcomponents in response to user input, each parameter subcomponent specifying an input parameter for invoking the DLL function, and each parameter subcomponent including a parameter data type and a parameter name.

11. The non-transitory computer readable medium of claim 1, wherein said computer program further comprises program instructions to:
  define said toolset as including a filter component having at least one associated condition subcomponent, each of the at least one condition subcomponents including a user-defined filter expression; and generate a linked collection of series components, filter components and condition subcomponents in response to user input, such that each of the filter expressions of said condition subcomponents are configured for application to a column of the sensor data table in said one or more data flows for sensor data.

12. The non-transitory computer readable medium of claim 1, wherein each of said links between said components and subcomponents of the toolset is received by a user setting a single property value via at least one of a visual interface or a programmatic interface.

13. The non-transitory computer readable medium of claim 1, wherein said computer program further comprises program instructions to:

define the linked collections of series components, field subcomponents and series table components as being contained in one or more central device components, each central device component corresponding to a software application for a different sensor device;

define said toolset as including a data sending component and a data receiving component; and generate a link between a data sending component in a first central device component (CDC) and a data receiving component in &second CDC in response to user input, the data sending component being configured to transmit sensor table data from the series table component of the first CDC to the data receiving component of the second CDC, the data receiving component being configured to receive the sensor table data from the first CDC and to automatically forward the sensor table data to a series component of the second CDC.

14. The non-transitory computer readable medium of claim 1, wherein said computer program further comprises program instructions to:

define said toolset as including a device writer component operable to output the sensor data table; and generate a linked collection of device writer components and series table components in response to user input, each device writer component being configured to use a connection string to populate at least one of a data file or a database with a row of sensor data responsive to its linked series table component being populated with a row of data.

15. A computer providing a component-based toolset for rapidly developing sensor device software applications, said computer comprising:

a microprocessor; and memory in communication with the microprocessor, the microprocessor being operable to execute computer program instructions stored in the memory to provide a hierarchical component-based toolset for rapidly developing sensor device software applications, said computer program instructions being configured to:

define said toolset as comprising a series component defining a data storage format for a sensor data table, at least one field subcomponent defining a column of the sensor data table, and a series table component defining said sensor data table; and generate linked collections of series components, field subcomponents and series table components to define one or more data flows for sensor data said linked collections being generated as object-oriented code in a developer environment in response to user input.

16. The computer of claim 15, the computer program instructions being further configured to:

receive said user input via at least one of a visual interface or a programmatic interface; and define the linked collections of series components, field subcomponents and series table components as being contained in one or more central device components, each central device component thereby defining one of said data flows for a user-specified sensor device.

17. The computer of claim 15, wherein said linked collections include series components, field subcomponents and series table components connected via a plurality of links, and wherein said user input is received in a graphical development environment that enables single-click definition and single entry definition of each of said plurality of links.

18. The computer of claim 15, wherein each of said data flows for sensor data includes a source of raw sensor data and an output for processed sensor data being connected via at least one of said linked collections of series components, field subcomponents and series table components.

19. The computer of claim 15, the computer program instructions being configured to:

define said toolset as including one or more group series subcomponents each defining a table row schema, and a sensor group component defining a collection of one or more group series subcomponents; and generate a linked collection of group series subcomponents and a plurality of field subcomponents in response to user input, each of the group series subcomponents defining a table row schema that includes field subcomponent columns from one or more series components.

20. The computer of claim 19, the computer program instructions being further configured to:

define said toolset as including a trigger subcomponent;

assign a condition to the trigger subcomponent in response to user input; and generate a linked collection of trigger subcomponents and selected sensor group components in response to user input, such that the selected sensor group component conditions creation of a table row as defined by the table row schema on the condition assigned to its linked trigger subcomponent being satisfied.

21. The computer of claim 19, wherein at least one group series component defines a custom data field to be appended to the table row schema.

22. The computer of claim 21, wherein the custom data field is a unique ID or a timestamp.

23. The computer of claim 15, the computer program instructions being further configured to:

define said toolset as including a command component defining a wrapper for a dynamic link library (DLL) function; and generate linked collections of command components and series components in response to user input, each command component wrapping its associated DLL function as a source of sensor data for its linked series component in one of said data flows for sensor data.

24. The computer of claim 23, the computer program instructions being further configured to:

define said toolset as including at least one parameter subcomponent defining a parameter of the wrapped DLL function; and generate linked collections of command components and parameter subcomponents in response to user input, each parameter subcomponent specifying an input parameter for invoking the DLL function, and each parameter subcomponent including a parameter data type and a parameter name.

25. The computer of claim 15, the computer program instructions being further configured to:
   define said toolset as including a filter component having at least one associated condition subcomponent, each of the at least one condition subcomponents including a user-defined filter expression; and
   generate a linked collection of series components, filter components and condition subcomponents in response to user input, such that each of the filter expressions of said condition subcomponents are configured for application to a column of the sensor data table in said one or more data flows for sensor data.

26. The computer of claim 15, wherein each of said links between said components and subcomponents of the toolset is received by a user setting a single property value via at least one of a visual interface or a programmatic interface.

27. The computer of claim 15, the computer program instructions being further configured to:
   define the linked collections of series components, field subcomponents and series table components as being contained in one or more central device components, each central device component corresponding to a software application for a different sensor device;
   define said toolset as including a data sending component and a data receiving component; and
   generate a link between a data sending component in a first central device component (CDC) and a data receiving component in a second CDC in response to user input, the data sending component being configured to transmit sensor table data from the series table component of the first CDC to the data receiving component of the second CDC, the data receiving component being configured to receive the sensor table data from the first CDC and to automatically forward the sensor table data to a series component of the second CDC.

28. The computer of claim 15, the computer program instructions being further configured to:
   define said toolset as including a device writer component operable to output the sensor data table; and
   generate a linked collection of device writer components and series table components in response to user input, each device writer component being configured to use a connection string to populate at least one of a data file or a database with a row of sensor data responsive to its linked series table component being populated with a row of data.

* * * * *